(12) United States Patent
Iwami et al.

(10) Patent No.: US 8,775,600 B2
(45) Date of Patent: Jul. 8, 2014

(54) STORAGE SYSTEM AND DATA MANAGEMENT METHOD IN STORAGE SYSTEM

(75) Inventors: Naoko Iwami, Sagamihara (JP);
Kiyotake Kumazawa, Tokyo (JP);
Akira Yamamoto, Sagamihara (JP);
Masaaki Iwasaki, Tachikawa (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 13/540,855

(22) Filed: Jul. 3, 2012

(65) Prior Publication Data

US 2012/0271934 A1   Oct. 25, 2012

Related U.S. Application Data

(63) Continuation of application No. 12/052,954, filed on Mar. 21, 2008, now Pat. No. 8,239,508.

(30) Foreign Application Priority Data

Dec. 27, 2007   (JP) ................................ 2007-336882

(51) Int. Cl.
*G06F 15/173*   (2006.01)
(52) U.S. Cl.
USPC ............ 709/223; 709/224; 709/225; 709/226
(58) Field of Classification Search
USPC .................. 709/223, 224, 225, 226
See application file for complete search history.

(56) References Cited

U.S. PATENT DOCUMENTS

| 6,839,803 | B1 * | 1/2005 | Loh et al. .................. 711/113 |
| 7,702,953 | B2 * | 4/2010 | Spear et al. ................. 714/5.11 |
| 7,784,083 | B2 * | 8/2010 | Tsusaka et al. ............... 725/134 |
| 2001/0046366 | A1 * | 11/2001 | Susskind ......................... 386/46 |
| 2003/0038731 | A1 * | 2/2003 | Sako et al. ............... 340/825.26 |
| 2003/0097454 | A1 * | 5/2003 | Yamakawa et al. .......... 709/229 |
| 2004/0111490 | A1 * | 6/2004 | Im et al. ........................ 709/218 |
| 2006/0026653 | A1 * | 2/2006 | Matsunami ..................... 725/81 |
| 2006/0031631 | A1 * | 2/2006 | Abe et al. ...................... 711/112 |
| 2006/0095482 | A1 * | 5/2006 | Suzuki et al. ................. 707/204 |
| 2006/0277316 | A1 * | 12/2006 | Wang et al. .................... 709/231 |
| 2007/0008909 | A1 * | 1/2007 | Tsusaka et al. ............... 370/259 |
| 2007/0035664 | A1 * | 2/2007 | Kamada et al. ............... 348/565 |
| 2007/0110394 | A1 * | 5/2007 | Yuasa ............................ 386/83 |
| 2007/0115804 | A1 * | 5/2007 | Hibino ......................... 370/216 |
| 2007/0198690 | A1 * | 8/2007 | Kodama ....................... 709/223 |
| 2007/0226810 | A1 * | 9/2007 | Hotti ............................... 726/30 |

(Continued)

FOREIGN PATENT DOCUMENTS

| JP | 2003085022 | 3/2003 |
| JP | 2004-192602 | 7/2004 |

(Continued)

*Primary Examiner* — Rupal Dharia
*Assistant Examiner* — Mohammed Ahmed
(74) *Attorney, Agent, or Firm* — Brundidge & Stanger, P.C.

(57) ABSTRACT

Provided is a storage center including a storage subsystem for storing content data to be used by the user's home server, and a center server for controlling the storage subsystem. The center server aggregates the content recording reservation requests sent from several home servers, obtains content data from a content server and stores the content data in the storage subsystem at a designated recording start time, and notifies the user's home server that the recording reservation is complete.

12 Claims, 22 Drawing Sheets

(56) References Cited

U.S. PATENT DOCUMENTS

| | | |
|---|---|---|
| 2008/0306962 A1* | 12/2008 | Grannan et al. ............... 707/10 |
| 2008/0307412 A1* | 12/2008 | Marr et al. ................... 717/177 |
| 2009/0063681 A1* | 3/2009 | Ramakrishnan et al. ..... 709/225 |
| 2009/0106388 A1* | 4/2009 | Iwami et al. ................. 709/217 |
| 2009/0172141 A1 | 7/2009 | Iwami et al. |
| 2011/0283074 A1* | 11/2011 | Okada et al. ................. 711/162 |

FOREIGN PATENT DOCUMENTS

| | | |
|---|---|---|
| JP | 2004206595 | 7/2004 |
| JP | 2004328382 | 11/2004 |
| JP | 2004334544 | 11/2004 |

* cited by examiner

FIG. 4

HOME SERVER-SIDE DATA MANAGEMENT TABLE 400

| INDEX | | | METADATA | | | | | | | RECORDING RESERVATION | | STORAGE DATE | DATA ADDRESS | |
|---|---|---|---|---|---|---|---|---|---|---|---|---|---|---|
| NAME | THUMBNAIL | FILE NAME | DATA TYPE | FORMAT TYPE | DATA SIZE | CREATOR | CREATED DATE | LAST ACCESS DATE | ... | RECORDING START | RECORDING END | | HOME SERVER | CENTER |
| 07 FIELD DAY | File A | 07 FIELD DAY | VIDEO | MPEG4 | 1.3GB | Suzuki | 2007.03.09 | 2007.10.05 | ... | Null | Null | 2007.10.06 | //C:/home/Movie1 | CENTER |
| CHRISTMAS | File B | CHRISTMAS | MUSIC | MP3 | 2KB | Yamada | 2006.12.24 | 2007.01.12 | ... | Null | Null | 2007.01.12 | Null | CENTER |
| PROGRAM C | File C | | | | | | 2007.05.05 | 2007.05.05 | ... | 2007.05.07 10:00:00 | 2007.05.07 11:00:00 | 2007.05.05 | Null | CENTER |
| ... | ... | ... | ... | ... | ... | ... | ... | ... | ... | ... | ... | ... | ... | ... |

FIG. 5

HOME SERVER-SIDE USER MANAGEMENT TABLE 500

| STORAGE CENTER ADDRESS (501) | USER ID (502) | PASSWORD (503) | LIMITING VALUE (504) | REMAINING CAPACITY (505) |
|---|---|---|---|---|
| xxx.123.456.789 | A | Fah&%daj | 100 GB | 150 GB |

FIG. 6

CENTER-SIDE USER MANAGEMENT TABLE 600

| USER ID | PASSWORD | MANAGEMENT TABLE POINTER | HOME SERVER ADDRESS | ... |
|---------|----------|--------------------------|---------------------|-----|
| A | Fah&%daj | Table_A | yyy.111.222.333 | ... |
| ... | ... | ... | ... | ... |

CENTER-SIDE DATA MANAGEMENT TABLE 700

| INDEX | | METADATA | | | | | | | RECORDING RESERVATION | | STORAGE DATE | DATA ADDRESS |
|---|---|---|---|---|---|---|---|---|---|---|---|---|
| NAME | THUMBNAIL | FILE NAME | DATA TYPE | FORMAT TYPE | DATA SIZE | CREATOR | CREATED DATE | LAST ACCESS DATE | ... | RECORDING START | RECORDING END | | |
| 07 FIELD DAY | File A | 07 FIELD DAY | VIDEO | MPEG4 | 1.3GB | Suzuki | 2007.03.09 | 2007.10.05 | ... | Null | Null | 2007.10.06. | //C/A/Movie1 |
| CHRISTMAS | File B | CHRISTMAS | MUSIC | MP3 | 2KB | Yamada | 2006.12.24 | 2007.01.12 | ... | Null | Null | 2007.01.12 | //C/B/Music1 |
| PROGRAM C | File C | | | | | | 2007.05.05 | 2007.05.05 | ... | 2007.05.07 10:00:00 | 2007.05.07 11:00:00 | 2007.05.05 | Null |
| ... | ... | ... | ... | ... | ... | ... | ... | ... | ... | ... | ... | ... | ... |

FIG. 8

CONTENTS MANAGEMENT TABLE 800

| INDEX 801 | | FILE NAME 802a | METADATA 802 | | | | | | | RECORDING RESERVATION 803 | | USER NAME 804 | DATA ADDRESS 805 |
|---|---|---|---|---|---|---|---|---|---|---|---|---|---|
| NAME 801a | THUMBNAIL 801b | | DATA TYPE 802b | FORMAT TYPE 802c | DATA SIZE 802d | PROVIDER 802e | CREATED DATE 802f | 802g | | RECORDING START 803a | RECORDING END 803b | | |
| MUSIC M | Null | | MUSIC | MP3 | 2MB | XX | 2007.03.09 | ... | | Null | Null | A, B | //C/A/Music1 |
| PROGRAM B | File B | PROGRAM B | TV | MPEG4 | 10GB | XX | 2006.12.24 | ... | | Null | Null | G, H | //C/A/Movie1 |
| PROGRAM C | File C | | TV | MPEG4 | | YY | | ... | | 2007.05.07 10:00:00 | 2007.05.07 11:00:00 | A, B, C | Null |
| ... | ... | ... | ... | ... | ... | ... | ... | ... | | ... | ... | ... | ... |

FIG. 9

MOBILE DEVICE MANAGEMENT TABLE 900

| DEVICE ID | PASSWORD | DEVICE TYPE | ... |
|---|---|---|---|
| A | Fah&%daj | MOBILE PHONE | ... |
| ... | ... | ... | ... |

MOBILE DEVICE ACCESS MANAGEMENT TABLE 1000

| HOME SERVER ADDRESS | HOME SERVER PASSWORD | STORAGE CENTER ADDRESS | USER ID | PASSWORD |
|---|---|---|---|---|
| yyy..111.222.333 | Kogfsdo8% | xxx.123.456.789 | A | Fah&%daj |
| ... | ... | ... | ... | ... |

1001, 1002, 1003, 1004, 1005

STORAGE SYSTEM AND DATA MANAGEMENT METHOD IN STORAGE SYSTEM

CROSS REFERENCE TO RELATED APPLICATION

The present application is a continuation application of Ser. No. 12/052,954, filed Mar. 21, 2008 now U.S. Pat. No. 8,239,508; which relates to and claims priority from Japanese Patent Application No. 2007-336882, filed on Dec. 27, 2007, the entire disclosures of which are incorporated herein by reference.

BACKGROUND OF THE INVENTION

The present invention generally relates to a storage system and a data management method in such a storage system, and in particular relates to a storage system that provides a storage service to a home server via a network as well as to a data management method using such a storage system.

In the homes of general users, various types of digital products, such as digital cameras, digital video recorders, personal computers, printers and the like, that process multimedia data are widely prevalent. In recent years, a home network system for connecting these digital products to a home network has been proposed, and there are even storage service providers who provide storage services to individual home network systems.

For example, Japanese Patent Laid-Open Publication No. 2004-192602 discloses a technology where a home server for controlling and managing a home network system connected to a plurality of home digital products storages data, and, by the home server periodically transferring and backing up the stored data to a portal server connected via the Internet, the lost data that was stored in the home server is restored based on the data backed up to the portal server if the home server malfunctions.

In addition, Japanese Patent Laid-Open Publication No. 2004-334544 discloses a technology where a content storage server stores a content received from a content sale server, creates and stores link information of such content, extracts the link information according to the content usage request received from a user terminal, extracts the content based on the extracted link information, and sends such content to the user.

SUMMARY OF THE INVENTION

Digital products are becoming more sophisticated in accordance with the advancement of hardware technology, and the amount of multimedia data processed by digital products is increasing drastically. In connection with this, although it is desirable to increase the storage capacity of the home server, increase of the storage capacity will become an inordinate burden on end users. Thus, it is anticipated that users will utilize storage service providers even more in order to increase the available storage capacity.

Moreover, due to enhancement of the network environment, users are even more actively obtaining their desired content data from the content provider via a network. On the other hand, since the amount of multimedia data is also increasing, it would be anticipated that the shortage of network resources will also become a problem.

Thus, an object of the present invention is to provide a storage system that is highly convenient for users of a home network system, enabling the efficient use of network resources.

In order to achieve the object, one aspect of the present invention provides a storage center including a storage subsystem configured to store content data to be used by home servers of users, and a center server configured to control the storage subsystem.

The center server includes a center-side data management table configured to manage the content data concerning each of the users, and a content management table configured to manage information concerning users who have access to the content data stored in the storage subsystem.

The center server receives a content recording reservation request sent from some of the home servers and registers the content recording reservation request in the content management table, obtains content data designated in the content recording reservation request from a content provider and stores the content data in the storage subsystem at a recording start time designated in the content recording reservation request, updates the center-side data management table concerning the user of the home server that sent the content recording reservation request, and sends a message showing that the content data has been stored in accordance with the content recording reservation request to the home server that sent the content recording reservation request in order to synchronize a home server-side data management table retained in the home server that sent the content recording reservation request and the center-side data management table.

Accordingly, the storage center can consolidate the recording reservation requests concerning the same content from a plurality of users. The storage center stores the content data sent from the content provider and notifies the completion of recording to the home server at the recording start time designated in the content recording reservation request. Thereby, the user will only need to download the content data from the storage center when such user wishes to use the content, and does not need to further back up the content data. Thus, in comparison to cases where each user directly acquires the content data from the content provider and sends the content data to the storage center for backup, the use of the bandwidth of the network can be spared.

According to another aspect, the present invention provides a storage system including home servers configured to be connectable to a digital device via a home network, and a storage center configured to be connectable to each of the home servers via an external network.

The home server includes a storage apparatus configured to store content data to be processed by the digital device, and a home server-side data management table configured to manage the content data.

The storage center includes a storage subsystem configured to store content data to be used by the home server, and a center server configured to control the storage subsystem. The center server includes a center-side data management table configured to manage content data concerning each of the users, and a content management table configured to manage information concerning users who have access to the content data stored in the storage subsystem The center server receives a content recording reservation request sent from several of the plurality of home servers and registers the content recording reservation request in the content management table, acquires content data of designated in the content recording reservation request from a content provider and stores the content data in the storage subsystem at a recording start time designated in the content recording reservation request, updates the center-side data management table concerning the user of the home server that sent the content recording reservation request, and sends a message showing that the content data has been stored according to the content recording reservation request to the home server that sent the content recording reservation request. The home server updates the home server-side data management table based on the message showing the storage of the content data.

According to another aspect, the present invention provides a data management method in a storage system including a plurality of home servers having a storage apparatus and connecting a digital device via a home network, and a storage center connected to each of the plurality of home servers via an external network and having a storage subsystem and a center server configured to control the storage subsystem.

The method comprises: sending, by at least one of the plurality of home servers, a content recording reservation request to the center server; receiving, by the center server, a content recording reservation request sent from the at least one of the plurality of home servers; registering, by the center server, the received content recording reservation request in a content management table, obtaining, by the center server, the content data designated in the content recording reservation request from a content provider and storing the content data in the storage subsystem at a recording start time designated in the content recording reservation request; updating, by the center server, the center-side data management table concerning the user of the at least one of the home servers that sent the content recording reservation request; sending, by the center server, a message showing that the content data was stored according to the content recording reservation request to the at least one of the home servers that sent the content recording reservation request; and updating, by the at least one of the home servers, a home server-side data management table based on the message showing the storage of the content data.

According to the present invention, it is possible to provide a storage system that is highly convenient for users of a home network system, enabling the efficient use of network resources.

In addition, according to the present invention, the storage center is required to store only one original data set obtained from the content provider, and the storage system can be operated efficiently since the capacity of the storage subsystem can be reduced.

BRIEF DESCRIPTION OF THE DRAWINGS

FIG. 4 is a diagram showing an example of a home server-side data management table in the storage system according to an embodiment of the present invention;

FIG. 5 is a diagram showing an example of a home server-side user management table in the storage system according to an embodiment of the present invention;

FIG. 6 is a diagram showing an example of a center-side user management table 600 in the storage system according to an embodiment of the present invention;

FIG. 7 is a diagram showing an example of a center-side data management table in the storage system according to an embodiment of the present invention;

FIG. 8 is a diagram showing an example of a content management table in the storage system according to an embodiment of the present invention;

FIG. 9 is a diagram showing an example of a mobile device management table in the storage system according to an embodiment of the present invention;

FIG. 10 is a diagram showing an example of a mobile device access management table in the storage system according to an embodiment of the present invention;

DETAILED DESCRIPTION OF THE DRAWINGS

Embodiments of the present invention are now explained with reference to the attached drawings.

(1) Configuration of Storage System

Figure 1:
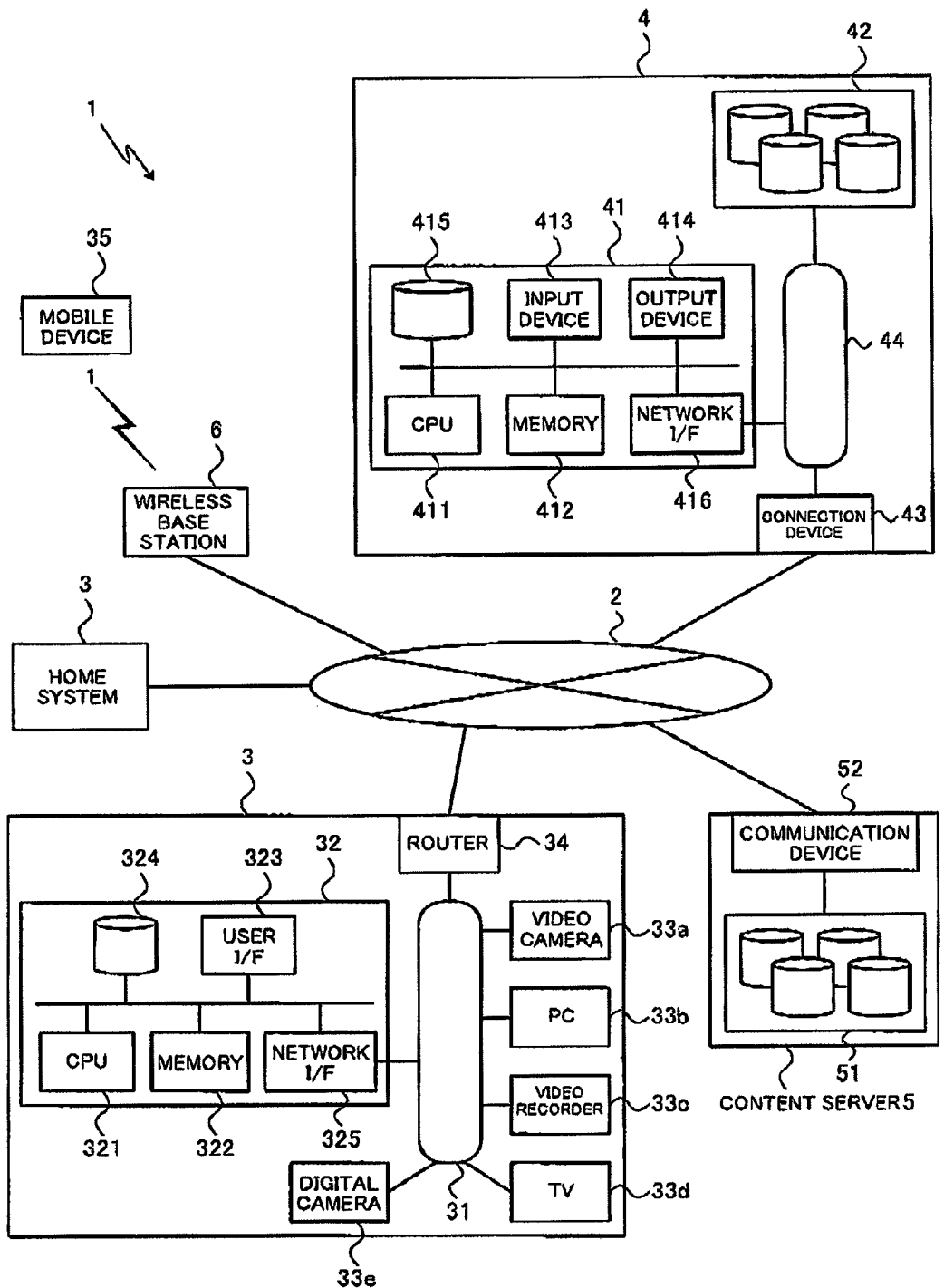
FIG. 1 is a block diagram showing a schematic configuration of a storage system according to an embodiment of the present invention.

FIG. 1 is a block diagram showing the schematic configuration of a storage system according to an embodiment of the present invention. As shown in FIG. 1, the storage system 1 is configured to include a plurality of home systems 3, a storage center 4, and a content server (content provider) 5, which are connected to each other via a network 2. The storage system 1 may also include a wireless base station 6. The network 2 may typically be configured from the Internet or an optical communication cable.

The home system 3 is composed of a home server 32 and various digital devices 33 connected to a home network 31. The home network 31, for example, is formed as a home wired or wireless LAN. The home system 3 is connected to the Internet 2 via a router 34.

The home server 32 is a server computer for intensively managing multimedia data (hereinafter simply referred to as "data," "content" or "content data") as content items to be handled by the digital devices 33 disposed in the home system 3. The home server 32 typically includes a processor (CPU) 321, a memory 322, a user interface 323, a storage apparatus 324, and a network interface 325.

The processor 321 executes a home server program loaded in the memory 322, thereby controlling the overall operation of the home server 32. The home server program, for example, performs processing for migrating prescribed content stored in the storage apparatus 324 to the storage center 4 when the remaining capacity of the storage apparatus 324 runs low. This processing is sometimes referred to as "data backup."

Figure 2:
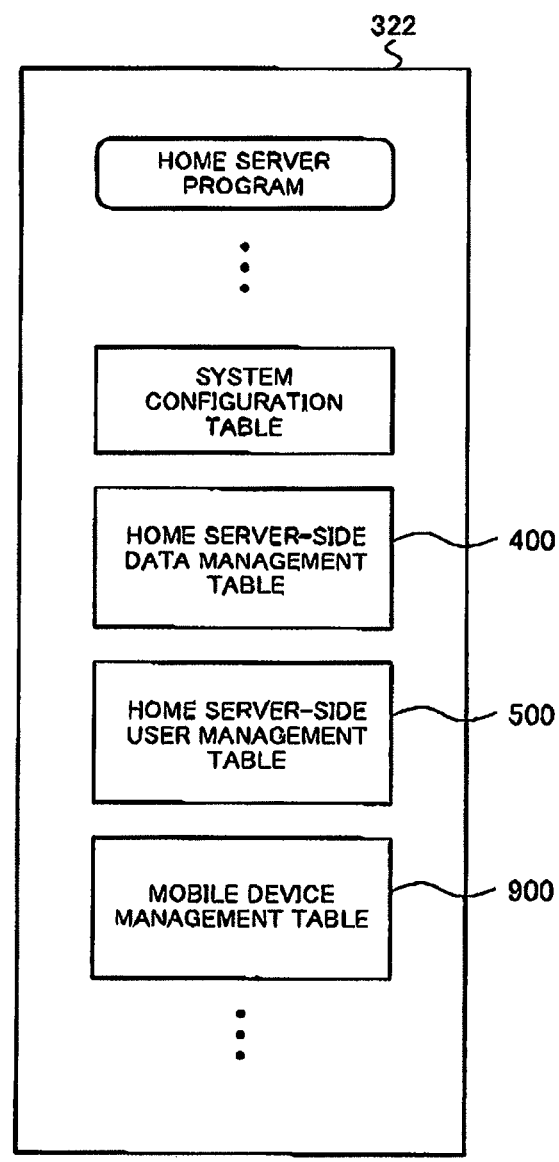
FIG. 2 is a diagram showing an example of the contents of a memory in a home server according to an embodiment of the present invention.

The memory 322 retains, as shown in FIG. 2, a system configuration table, a home server-side data management table 400, a home server-side user management table 500, and a mobile device management table 900, and these tables are utilized for operation of the processor 321. These tables, for example, are read from the storage apparatus 324 and loaded into the memory 322 under the control of the processor 321 when the home server 3 is booted.

The user interface 323 is configured from, among others, a keyboard, a mouse, a display, a speaker. The user can set and manage the home server 32 via the user interface 323. Although the home server 32 is configured to include the user interface 323 in this embodiment, the configuration is not limited thereto. For example, a configuration may also be adopted where the user accesses the home server 32 by using a user interface of the personal computer connected to the home network 31.

The storage apparatus 324 is a local storage apparatus including a storage medium for storing data disposed within the home system 3. The storage apparatus 324 may be configured from, for example, a plurality of hard disk drives or a plurality of nonvolatile semiconductor memory modules.

The home server 32 may also include an extended I/F unit (not shown). The extended I/F unit is an interface for directly connecting the digital devices 33. Although the digital devices 33 are configured to be connected to the home server 32 via the home network 31 in this embodiment, a configuration may also be adopted where a digital device 33 such as a USB memory is directly connected to the extended I/F unit so that it becomes accessible by the processor 321 of the home server 32.

The digital devices 33 are, for example, a video camcorder 33a, a personal computer 33b, a video recorder 33c such as a DVD recorder/player, a TV 33d, a digital still camera 33e, and so on. An audio component system is also included in the digital devices 33. Each digital device 33 is typically configured by including a microprocessor, a memory, and a system component that meets the usage thereof. The digital device 33 may be directly connected to the home network 31 by possessing a network connection function, or connected to the home network 31 via another device.

The digital device 33 is typically accessed by the home server 32 based on a master/slave control system. Namely, the home server 32 can access the digital device 33 connected via the home network 31, and read the data stored in the memory of the digital device 33. Alternatively, the digital device 33 may actively access the home server 32, and send specific data to the home server 32.

The storage center 4 is a system for providing a storage service to each user's home system 3. The storage center 4 is configured to allow the home server 32 of the home system 3 to "transparently" use the resource (i.e., storage area) of the storage center 4. The term "transparency" as used herein refers to a lack of awareness of the existence of the storage center 4 when using the resource of the storage center 4. The storage center 4 is typically run by the storage service provider.

The storage center 4 includes a center server 41, a storage subsystem 42, and a communication device 43. These apparatuses may be connected to each other via an internal network 44.

The center server 41 is a controller or a computer for controlling the overall operation of the storage center 4 and, therefore, includes a processor and other hardware components. FIG. 1 shows a processor (CPU) 411, a memory 412, an input device 413, an output device 414, an auxiliary storage apparatus 415, and a network interface 416 as such hardware components. The center server 41 may be a distributed system configured from a plurality of computers.

The processor 411 executes a center server program loaded in the memory 412, thereby controlling the overall operation of the center server 41.

Figure 3:
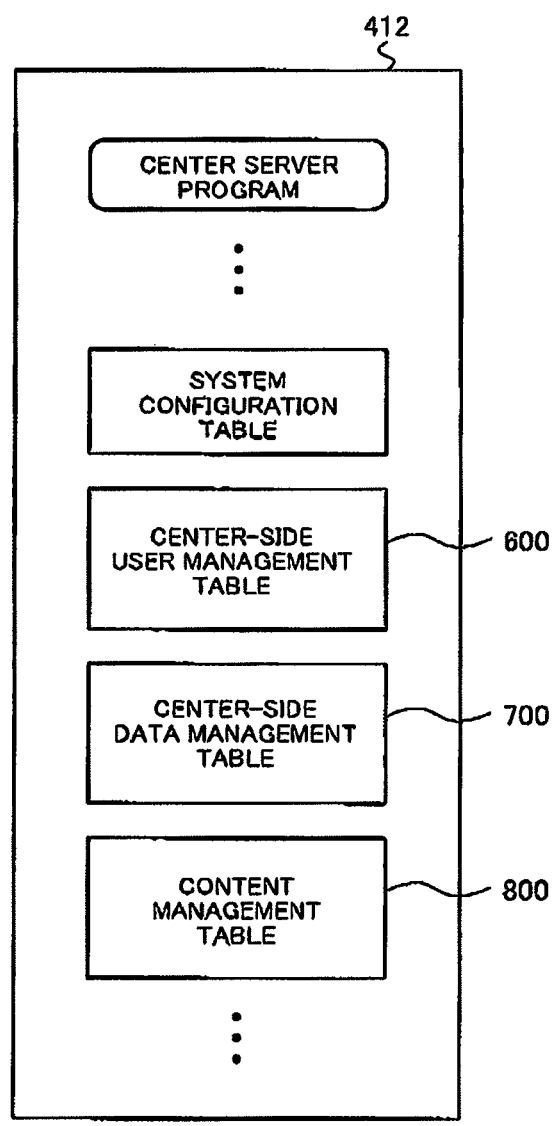
FIG. 3 is a diagram showing an example of the contents of a memory in a center server according to an embodiment of the present invention.

The memory 412 retains, as shown in FIG. 3, a system configuration table, a center-side user management table 600, a center-side data management table 700, and a content management table 800, and these tables are utilized for operation of the processor 411.

The storage subsystem 42 is an apparatus including a storage medium for storing data located in the storage center 4. The storage subsystem 42 is configured from, for example, a plurality of hard disk drives or a plurality of nonvolatile semiconductor memory modules. The storage subsystem 42 adopts, for example, a RAID configuration to meet the demands of large capacity and high reliability.

The content server 5 is a system for providing digital content such as music and movies to users for a fee or free of charge. The content server 5 is run by the content provider. The storage service provider and the content provider may be the same vendor. The user may operate the home server 32 and directly access the content server 5. In this embodiment, the user accesses the content server 5 via the storage center 4.

The content server 5 includes a storage subsystem 51 for storing a number of content items that can be provided to users, and is connected to the Internet 2 via a communication device 52.

The wireless base station 6 is a base station for conducting wireless communication with the user's mobile device 35. In this embodiment, a mobile phone and a car navigation system are illustrated as the mobile devices 35.

(2) Configuration of Various Tables
(2-1) Home Server-Side Data Management Table 400

FIG. 4 is a diagram showing an example of the home server-side data management table 400 in the storage system according to an embodiment of the present invention. The home server-side data management table 400 is a table retained by the home server 32, and utilized for managing the data handled by the digital devices. As shown in FIG. 4, the home server-side data management table 400 comprises an index column 401, a metadata column 402, a recording reservation column 403, a storage date column 404, and a data address column 405.

The index column 401 is a column for storing index information of data, and includes a name column 401a showing the name of that data, and a thumbnail column 401b showing the file name for visually representing the subject matter of that data.

The metadata column 402 is a column for storing attribute information of data. Attribute information, for instance, includes a file name column 402a showing the file name of data, a data type column 402b showing the type (i.e., video data, audio data or the like) of that data, a format type column 402c showing the format type of that data, a data size column 402d showing the data size of that data, a creator column 402e showing the creator who created that data, a created date column 402f showing the date on which that data was created, and a last access date column 402g showing the last access date of that data.

The recording reservation column 403 is a column for storing reservation information that is used to record undistributed data at the time that it is distributed. The recording reservation column 403 includes a recording start date column 403a showing the date on which the recording of that data will start, and a recording end date column 403b showing the date on which the recording of that data will end.

The storage date column 404 is a column for storing date information regarding the date that the data and/or metadata was stored in the storage subsystem 42 of the storage center 4. If neither the data nor the metadata is stored in the storage subsystem 42 of the storage center 4, "NULL" is placed in the storage date column.

The data address column 405 is a column for storing storage destination information (e.g., a file path) of data, and includes a home server column 405a and a center column 405b. If relevant data is stored in the home server, the storage destination address in the home server 32 is placed in the home server column 405a, and if relevant data is not stored in the home server 32, "NULL" is placed in the home server column 405a. In addition, if relevant data is stored in the storage center 4, "center" is placed in the center column 405b, and if relevant data is not stored in the storage center 4, "NULL" is placed in the center column 405b. The value of the data address column 405 is updated when the home server 32 downloads data from the storage center 4, or uploads data to the storage center 4 for backup.

(2-2) Home Server-Side User Management Table 500

FIG. 5 is a diagram showing an example of the home server-side user management table 500 in the storage system according to an embodiment of the present invention. The home server-side user management table 500 is a table retained by the home server, and used for storing information concerning users of the home server 32 that use the storage center 4.

The home server-side user management table 500 includes a storage center address column 501 showing an address (e.g., an IP address) of the storage center 4 that is available to the home server 32, a user ID column 502 and a password column 503 that are required for accessing the storage center 4, a limiting value column 504 showing the minimum capacity value to be secured in the storage apparatus 324, and a remaining capacity column 505 showing the current remaining capacity in the storage apparatus 324.

The user management table is preferably stored by being encrypted with a prescribed encryption/decryption module.

(2-3) Center-Side User Management Table 600

FIG. 6 is a diagram showing an example of the center-side user management table 600 in the storage system according to an embodiment of the present invention. The center-side user management table 600 is a table retained by the storage center 4, and utilized for managing information concerning users of each home server 32 that uses the storage center 4.

The center-side user management table 600 includes, for example, a user ID column 601, a password column 602, a management table pointer column 603, and a home server address column 604. The user ID column 601 shows the ID of the user using the storage service of the storage center 4. The password column 602 shows the password registered by that user. The management table pointer column 603 shows the linked pointer of the center-side data management table 700 for managing the data owned by that user in the storage center 4. The home server address column 604 shows the address allocated to the home server 32 using the storage center.

(2-4) Center-Side Data Management Table 700

FIG. 7 is a diagram showing an example of the center-side data management table 700 in the storage system according to an embodiment of the present invention. The center-side data management table 700 is a table retained by the storage center 4, and utilized for managing the data owned by the user.

The center-side data management table 700 is basically configured the same as the home server-side data management table 400, but the data address column 705 only retains the address in the storage center 4.

(2-5) Content Management Table 800

FIG. 8 is a diagram showing an example of the content management table 800 in the storage system according to an embodiment of the present invention. The content management table 800 is a table retained by the storage center 4, and utilized for managing users who can access the content acquired from the content server 5.

The content management table 800 is basically configured the same as the foregoing home server-side data management table 400 (or the center-side data management table 700), but the metadata column 802 is provided with a provider column 802e showing the provider of that content in substitute for the creator column. In addition, the content management table 800 includes a user name column 804 showing the users who can access the respective contents. Users who are registered in the user name column 804 are users who have legitimately acquired the content or users who have been legitimately licensed to use the content. For example, users who made a content recording reservation using the recording reservation function of the home server 32 and accepted by the storage center 4, and users who purchased the content from the content server 5 correspond to the foregoing legitimate users.

The data address column 805 only retains the address in the storage center 4. If the center server 41 has not received the content from the content server 5, "NULL" is written in the data address column 805. For example, if the center server 41 accepts the recording reservation of a certain content but the provision of such content has not yet started, "NULL" is written in the data address column 805.

(2-6) Mobile Device Management Table 900

FIG. 9 is a diagram showing an example of the mobile device management table 900 in the storage system according to an embodiment of the present invention. The mobile device management table 900 is a table retained by the home server 32, and utilized for storing information concerning mobile devices that are able to access the home server 3 and the storage center 4 from outside the home system 3.

The mobile device management table 900 includes a device ID column 901 for uniquely identifying the mobile device 35, a password column 902 required for accessing the home server 32, and a device type column 903 showing the type of mobile device 35.

The mobile device management table 900 is preferably stored by being encrypted with a prescribed encryption/decryption module.

(2-7) Mobile Device Access Management Table 1000

FIG. 10 is a diagram showing an example of the mobile device access management table 1000 in the storage system according to an embodiment of the present invention. The mobile device access management table 1000 is a table retained by the mobile device 35, and utilized for storing information required for accessing the home server 32 and the storage center 4.

The mobile device access management table 1000 includes a home server address column 1001, a home server password column 1002, a storage center address column 1003, a user ID column 1004, and a password column 1005.

The home server address column 1001 shows the address allocated to the home server 32 using the storage center. The home server password column 1002 shows the password required for accessing the home server 32. The storage center address column 1003 shows the address (for instance, the IP address) of the storage center 4 that is available to the home server 32. The user ID column 1004 shows identifying information allocated uniquely to the user. The password column 1005 shows the password required for accessing the storage center 4.

Figure 11:
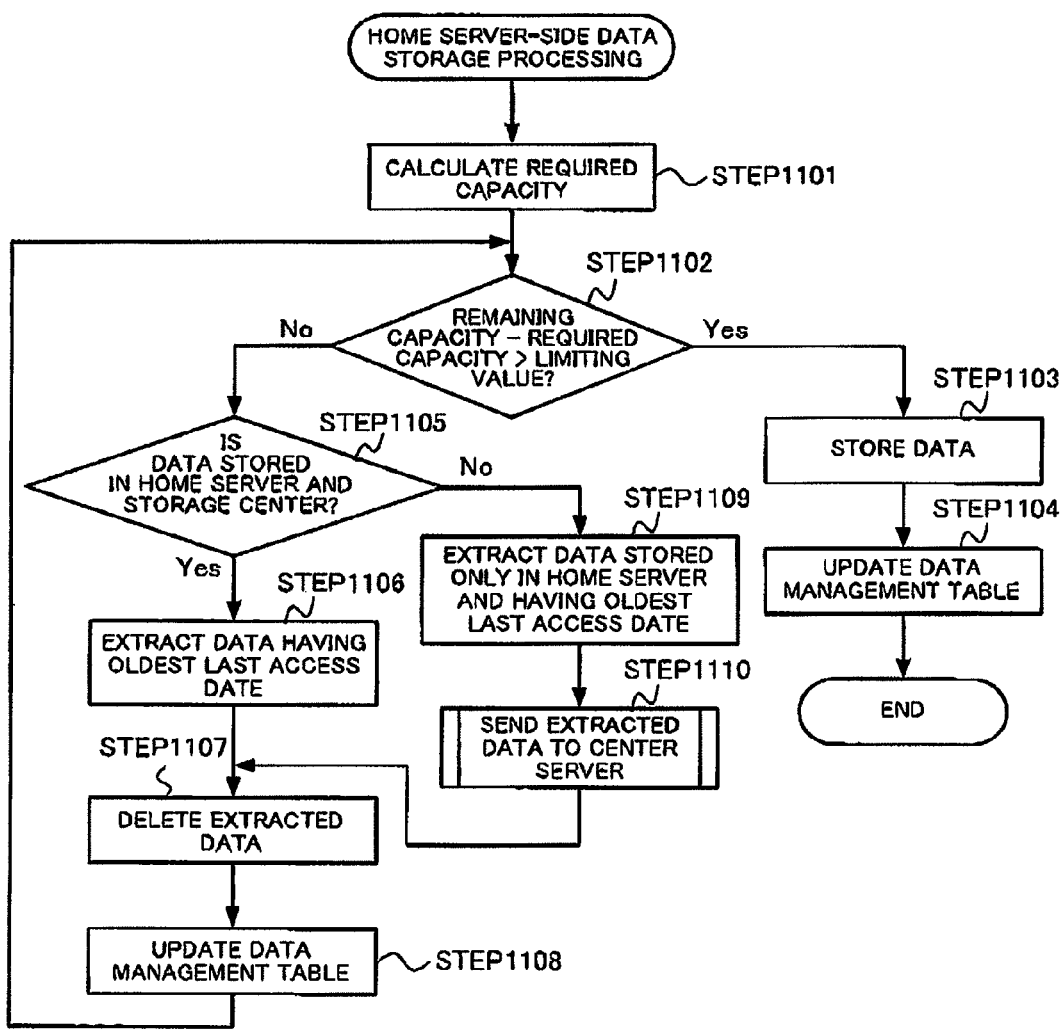
FIG. 11 is a flowchart explaining content data storage processing in the home server according to an embodiment of the present invention.

(3) Explanation of Various Types of Processing (3-1) Content Data Storage Processing in Home Server FIG. 11 is a flowchart explaining the content data storage (upload) processing in the home server 32 according to an embodiment of the present invention. The content storage processing is realized by the processor 321 of the home server 32 executing the home server program.

Specifically, as shown in FIG. 11, when the home server 32 receives a content data storage request from a certain digital device 33, the home server 32 calculates required storage capacity in the storage apparatus 324 based on the size of the content data accompanying with the storage request (STEP 1101). Subsequently, the home server 32 refers to the home server-side user management table 500, and determines whether the value obtained by adding the calculated required capacity to the current remaining capacity in the storage apparatus 324 exceeds the limiting value 504 (STEP 1102). If the home server 32 determines that the value exceeds the limiting value 504 (STEP 1102; Yes), the home server 32 stores that data in a prescribed area of the storage apparatus 324 (STEP 1103), updates the home server-side data management table 400 and the home server-side user management table 500 (STEP 1104), and ends the storage processing.

Meanwhile, if the home server 32 determines that the foregoing value is less than the limiting value 504; that is, determines that the unused capacity is insufficient (STEP 1102; No), the home server 32 secures the unused capacity in the storage apparatus 324 by performing the following processing.

Specifically, the home server 32 refers to the data address column 405 of the home server-side data management table 400 and determines whether there is one or more content data stored in both the storage apparatus 324 of the home server 32 and the storage center 4 (STEP 1105). If the home server 32 determines that there is content data that has been stored in both the storage apparatus 324 of the home server 32 and the storage center 4 (STEP 1105; Yes), the home server 32 refers to the last access date column 402g of the home server-side data management table 400, extracts the content data having the oldest last access date from among the content data (STEP 1106), and deletes the extracted content data (STEP 1107). Subsequently, the home server 32 updates the home server-side data management table 400 and the home server-side user management table 500 (STEP 1108), and returns to the processing at STEP 1102 in order to determine whether the unused capacity has been secured.

Meanwhile, if the home server 32 determines that there is no content data that has been stored in both the storage apparatus 324 of the home server 32 and the storage center 4 (STEP 1105; No), the home server 32 performs the following processing in order to back up the content data stored only in the storage apparatus 324 and which has not yet been backed up to the storage center 4. In other words, the home server 32 extracts the data having the oldest last access data among all content data stored only in the storage apparatus 324 (STEP 1109). Subsequently, the home server 32 logs into the center server 41 of the storage center 4 in order to back up the extracted data to the storage center 4, and sends the extracted data to the center server 41 (STEP 1110). By way of this, the center server 41 of the storage center 4 stores the content data sent from the home server 32 in a prescribed area of the storage subsystem 42, and updates the center-side data management table 700.

After uploading the content data to the storage center 4, the home server 32 deletes that content data from the storage apparatus 324 (STEP 1107). Subsequently, the home server 32 updates the home server-side data management table 400 and the home server-side user management table 500 (STEP 1108), and returns to the processing at STEP 1102 in order to determine whether the unused capacity has been secured.

As described above, if the storage capacity in the storage apparatus 324 is less than a prescribed limiting value in view of the data storage request from the digital device 33, the home server 32 backs up prescribed data in the storage apparatus 324 to the storage center 4, secures the required storage capacity, and then stores the data.

If the home server 32 provides content data that has been backed up to the storage center 4 and that does not exist in the storage apparatus 324 to the digital device 33, the home server 32 may log into the center server 41 as needed and download the desired data. In this case also, the home server-side data management table 400 and the center-side data management table 700 are updated so as to be synchronized.

(3-2) Content Recording Reservation Processing

Figure 12:
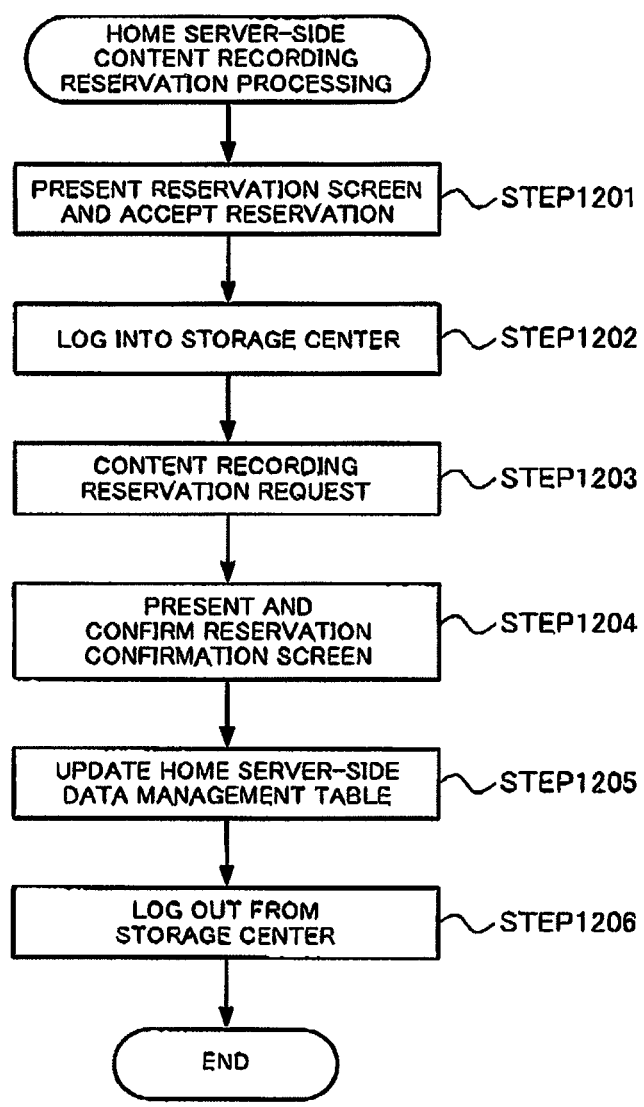
FIG. 12 is a flowchart explaining content recording reservation processing in the home server according to an embodiment of the present invention.

FIG. 12 is a flowchart explaining the content recording reservation processing in the home server 32 according to an embodiment of the present invention. The content recording reservation processing is realized by the processor 321 of the home server 32 executing the home server program.

Specifically, as shown in FIG. 12, for example, when the user operates the user interface 323 of the home server 32 and calls up a content recording reservation function, the home server 32 presents a content recording reservation screen (not shown) to the user, and then accepts a content recording reservation from the user (STEP 1201). The content recording reservation, for example, is a reservation for recording a TV program if the service is a program distribution service provided by a TV station or the like. When making the content recording reservation, the content to be subject to recording reservation may be designated by directly inputting content identifying information such as a content code, or designated according to the contents list distributed electronically from the content server 5.

When the home server 32 accepts the content recording reservation, it refers to the home server-side user management table 500, connects to the storage center 4 according to the address of the storage center 4, sends the user ID and the password, and logs into the storage center 4 (STEP 1202). Subsequently, the home server 32 sends the content recording reservation request received from the user to the storage center 4 (STEP 1203). The content recording reservation request, for example, includes the content identifying information (e.g., content name and file name) and the recording reservation information (e.g., recording start time and recording end time). Upon receiving this request, the storage center 4 accepts the content recording reservation made by that user.

When the home server 32 receives a recording reservation acceptance completion message from the storage center 4, the home server 32 presents a content recording reservation confirmation screen to the user, and prompt the user to confirm the content recording reservation (STEP 1204). When the home server 32 receives the user's confirmation regarding the content recording reservation confirmation screen, the home server 32 updates the home server-side data management table 400 according to the subject matter of the accepted recording reservation (STEP 1205). The home server 32 thereafter logs out from the storage center 4 (STEP 1206), and then ends the content recording reservation processing.

In the foregoing example, although the user directly performed the operation of content recording reservation to the home server 32, the user may make a content recording reservation using the reservation function of the video recorder 33c, thereby allowing the home server 32 to accept the content recording reservation from the video recorder 33c. In this case also, the home server 32 will log into the storage center 4, and the storage center 4 will accept the content recording reservation.

Figure 13:
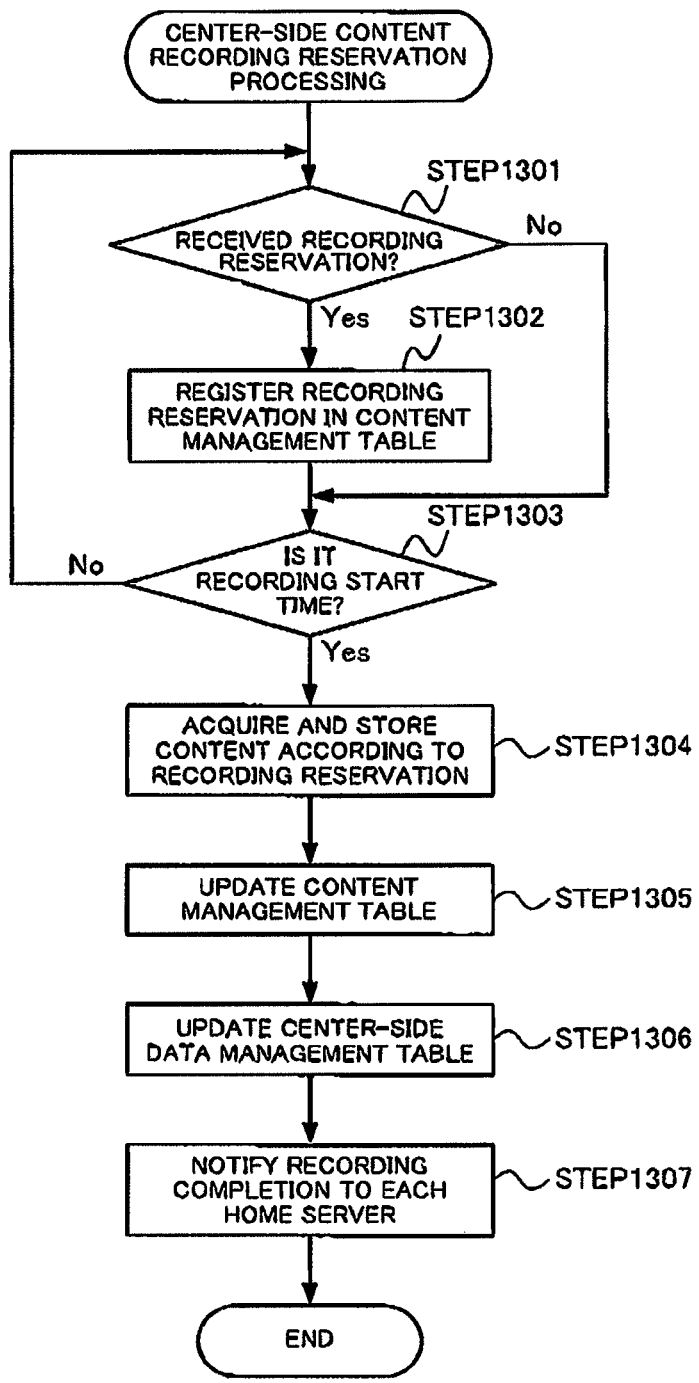
FIG. 13 is a flowchart explaining content recording reservation processing in the storage center according to an embodiment of the present invention.

FIG. 13 is a flowchart explaining the content recording reservation processing in the storage center 4 according to an embodiment of the present invention. The content recording reservation processing is realized by the processor of the center server 41 executing the center server program.

Specifically, as shown in FIG. 13, the center server 41 monitors whether there is a content recording reservation request from the home server 32 (STEP 1301). If the center server 41 receives a content recording reservation request from the home server 32 (STEP 1301; Yes), the center server 41 registers the content recording reservation in the content management table 800 (STEP 1302). Namely, the center server 41 registers the recording start date and the recording end date in the recording reservation column 803 of the content management table 800, and registers the user ID of the user who issued the content recording reservation request in the user name column 804. Further, the center server 41 updates the center-side data management table 700 regarding that user.

Subsequently, the center server 41 determines whether it has reached the recording start time of the content designated in the content recording reservation (STEP 1303), and accepts the content recording reservation until it reaches the designated recording start time. If content recording reservations are received from a plurality of users, a plurality of users will be registered in the user name column regarding that content in the content management table 800.

If the center server 41 determines that it has reached the recording start time of the designated content (STEP 1303; Yes), the center server 41 obtains the content data that becomes available at such recording start time from the content server 5, and stores the content data in a prescribed area of the storage subsystem 42 (STEP 1304).

In doing so, if the center server 41 receives content recording reservations from the respective users, the same content recording reservation requests are consolidated into a single request. When the center server 41 completes obtaining and storing a single content item from the content server 5 based on the single content recording reservation request, the center server 41 updates the content management table 800 (STEP 1305). Specifically, the center server 41 registers the name of the provider that sent the content in the provider column 803e of the content management table 800, and registers the storage destination address in the data address column 805. The center server 41 additionally updates the center-side data management table 700 regarding the user who issued the content recording reservation request (STEP 1306). Specifically, the center server 41 registers the storage destination address in the data address column 705 regarding that content.

The center server 41 thereafter refers to the content management table 800, and sends a recording completion notice to the home server 32 of each user who made the content recording reservation (STEP 1307). Upon receiving this recording completion notice, the home server 32 updates the home server-side data management table 400. The home server-side data management table 400 and the center-side data management table 700 are thereby synchronized, and the consistency thereof is maintained.

The home server 32 that received the content recording reservation from the user as described above sends the content recording reservation to the storage center 4, and the storage center 4 accepts such content recording reservation. The storage center 4 thereafter acquires content data that becomes available at the recording start time designated in the content recording reservation from the content server 5, stores such content data, and notifies the completion of recording to the home server 32. In this case, if the storage center 4 receives content recording reservation requests from a plurality of users, the same content recording reservation requests are consolidated into a single request, and the storage center 4 will consequently store one item of content data for a plurality of users. Thus, it is no longer necessary to store the same content data in the storage area allocated to each user of the storage subsystem 42, and the storage capacity of the storage subsystem 4 can thereby be conserved.

In addition, the user will only need to download the content item from the storage center 4 when such user wishes to use the content, and does not need to back up the content item once again. Thus, in comparison to cases where the respective user directly obtain the content items from the content server 5 and send the content items to the storage center 4 for backup, the use of the band of the network 2 can be spared.

Figure 14:
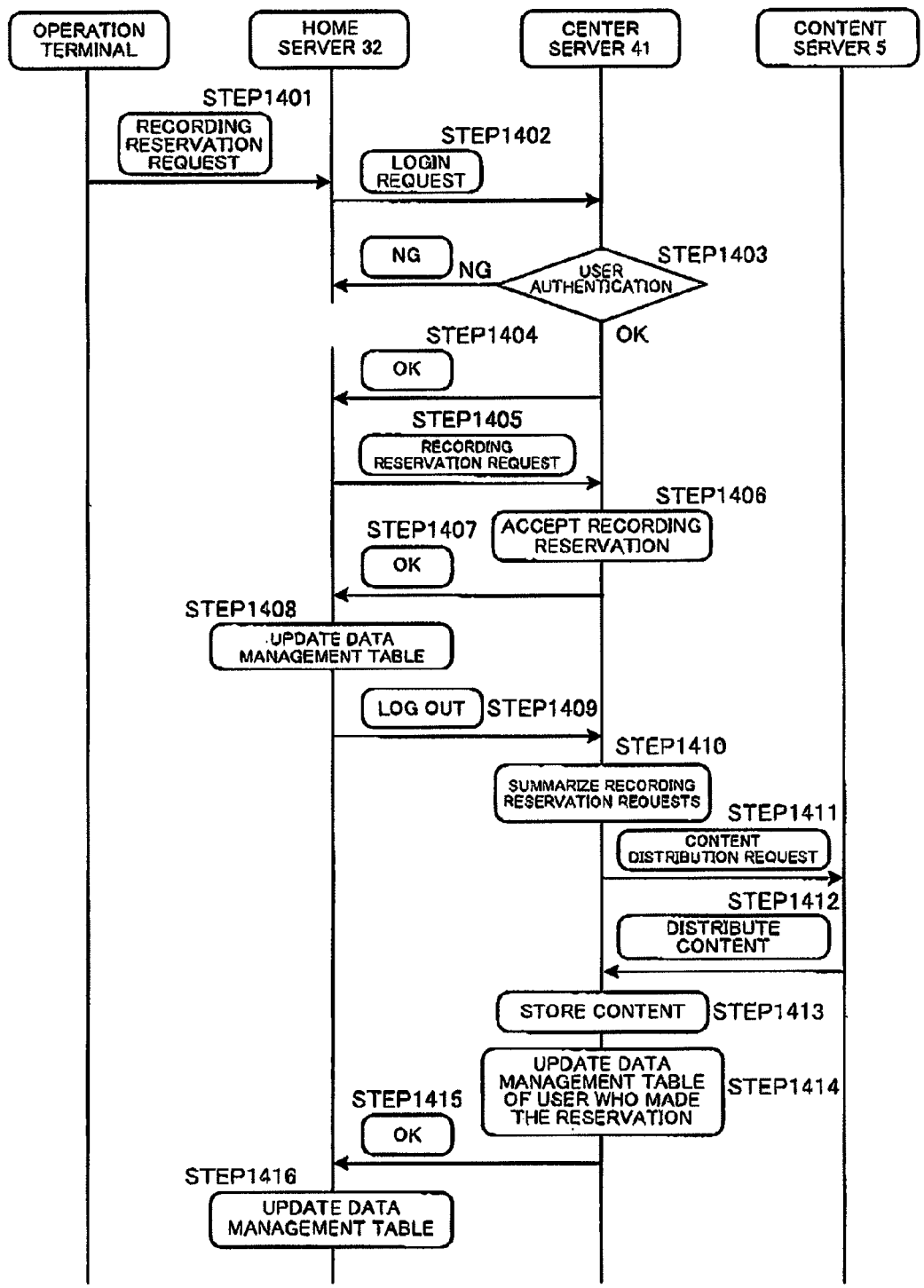
FIG. 14 is a sequence chart explaining an example of content recording reservation processing in the storage system according to an embodiment of the present invention.

FIG. 14 is a sequence chart explaining an example of the content recording reservation processing in the storage system 1 according to an embodiment of the present invention. FIG. 14 shows an example of making a content recording reservation by the user directly designating the content, and not based on the contents list.

Specifically, as shown in FIG. 14, the user operates the operation terminal and sends a content recording reservation request to the home server 32 (STEP 1401). The operation terminal may be the user interface of the home server 32, or another digital device 33 such as a PC or a mobile device 35.

The home server 32 that received the content recording reservation request sends a login request to the center server 4 for registering the content recording reservation in the center server 41 of the storage center 4 (STEP 1402). The center server 41 authenticates the user who sent the login request (STEP 1403), and, if the authentication is successful, sends an authentication success message to the home server 32 (STEP 1404). Meanwhile, if the authentication ends in a failure, the center server 41 returns an authentication failure message.

When the home server 32 receives an authentication success message, the home server 32 sends the content recording reservation request to the center server 41 (STEP 1405), and the center server 41 accepts the content recording reservation request (STEP 1406). Subsequently, the center server 41 sends a message indicating the acceptance of the content recording reservation request to the home server 32 (STEP 1407).

Upon receiving the message, the home server 32 updates the home server-side data management table 400 (STEP 1408), and logs out from the storage center 4 (STEP 1409). At this point in time, since only the content recording reservation has been made and the content data is yet to be recorded, the data address column in the home server-side data management table 400 is still indicated as "NULL."

The center server 41 receives the foregoing content recording reservations from the respective users and aggregates the users' recording reservation requests for each content item (STEP 1410). If the center server 41 determines that it has reached the recording start time of the content, the center server 41 sends a content data distribution request to the content server 5 as the providing source of the content (STEP 1411). Upon receiving the request, the content server 5 distributes the content data to the center server 41 (STEP 1412).

When the center server 41 receives the content data distributed from the content server 5, the center server 41 stores the content data in the storage subsystem 42 (STEP 1413). After storing the content data, the center server 41 updates the content management table 800. At the time the storage of the content data is completed, the center server 41 updates the center-side data management table 700 regarding the user who issued the content recording reservation request for that content (STEP 1414). In other words, the storage destination address of that content will be registered in the data address column of the center-side data management table 700. The center server 41 thereafter sends a message indicating the completion of recording to the home server 32 (STEP 1415).

When the home server 32 receives a message indicating the completion of recording from the storage center 4, the home server 32 updates the home server-side data management table 400 (STEP 1416). Specifically, "center" is registered in the data address column of the home server-side data management table 400 to show that the content is located in the storage center 4.

Thus, the content item is available to the user. When the user wants to actually use the content, the home server 32 downloads the content from the storage center 4 and provides such content to a prescribed digital device to make it available to the user.

Figure 15:
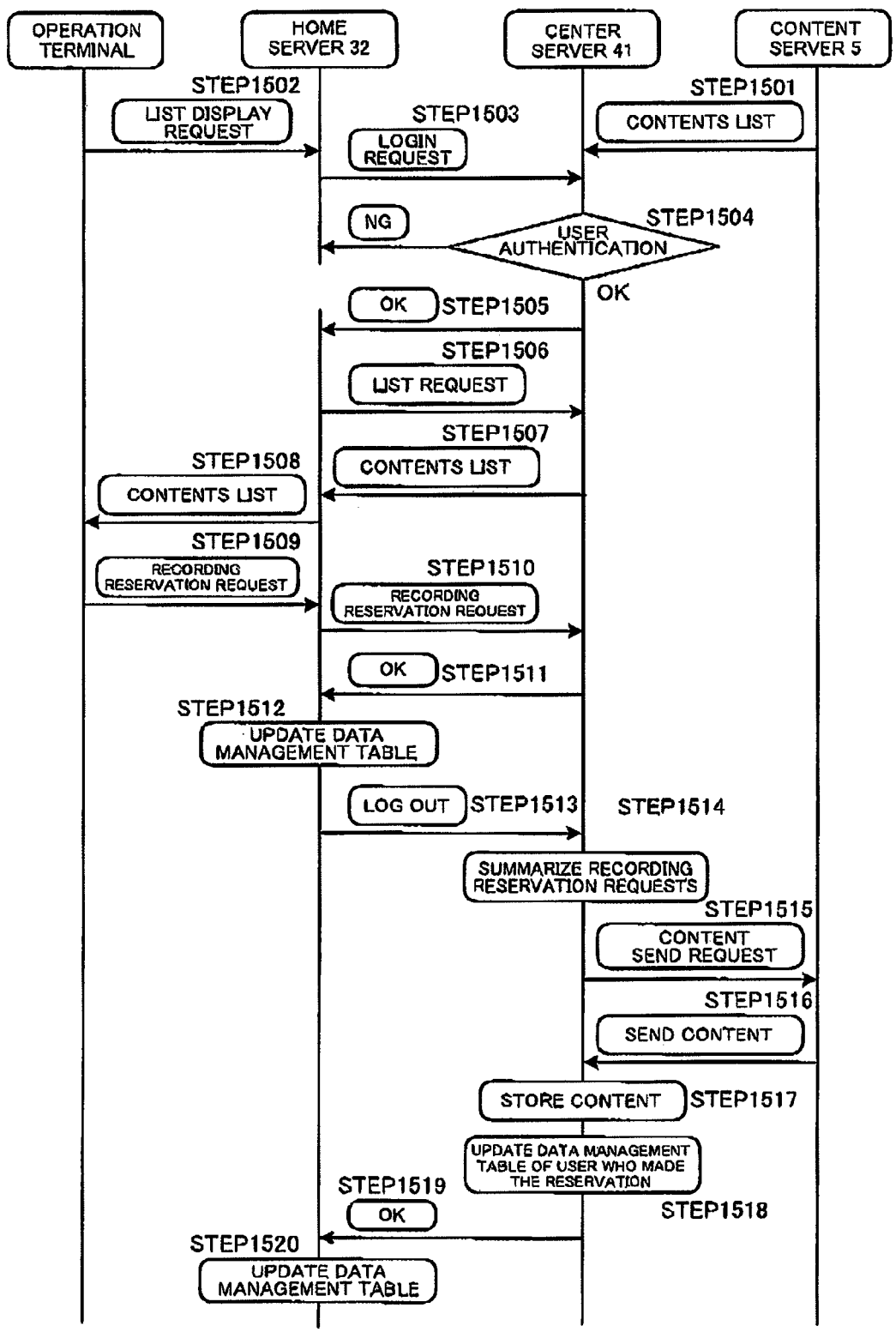
FIG. 15 is a sequence chart explaining an example of content recording reservation processing in the storage system according to an embodiment of the present invention.

FIG. 15 is a sequence chart explaining an example of the content recording reservation processing in the storage system 1 according to an embodiment of the present invention. FIG. 15 shows an example of the user making a content recording reservation based on the contents list.

Specifically, as shown in FIG. 15, the content server 5, for instance, distributes one-day worth or one-week worth of the content distribution schedule as the content list to the center server 41 in advance (STEP 1501). The center server 41 stores the distributed content list in the memory 412, and provides the content list upon receiving a content list request from the home server 32.

The user operates the operation terminal and sends a contents list request to the home server 32 (STEP 1502). The operation terminal may be the user interface of the home server 32, or another digital device 33 such as a PC or a mobile device 35.

The home server 32 that received the content list request sends a login request to the center server 41 (STEP 1503). The center server 41 authenticates the user who sent the login request (STEP 1504), and, if the authentication is successful, sends an authentication success message to the home server 32 (STEP 1505).

Upon receiving the foregoing message, the home server 32 sends the content list request to the center server 41 (STEP 1506), and the center server 41 sends the content list to the home server 32 (STEP 1507).

The home server 32 that received the content list transfers the content list to the operation terminal of the source of request (STEP 1508). The content list is thereby displayed on the user's operation terminal. If the operation termination of the source of request does not have sufficient display capability such as with a mobile device, the home server 32 may convert the layout of the content list to match the mobile device before sending such content list to the mobile device. The user operates the operation terminal and designates the content to be subject to recording reservation with reference to the content list. The operation terminal sends the content recording reservation request to the home server 32 according to the user's designation.

When the home server 32 receives the content recording reservation request, the home server 32 sends the content recording reservation request to the center server 41 (STEP 1509). Since the subsequent processing sequence is the same as STEP 1406 to STEP 1416 of FIG. 14 described above, the explanation thereof is omitted.

(3-3) Content Purchase Processing

Figure 16:
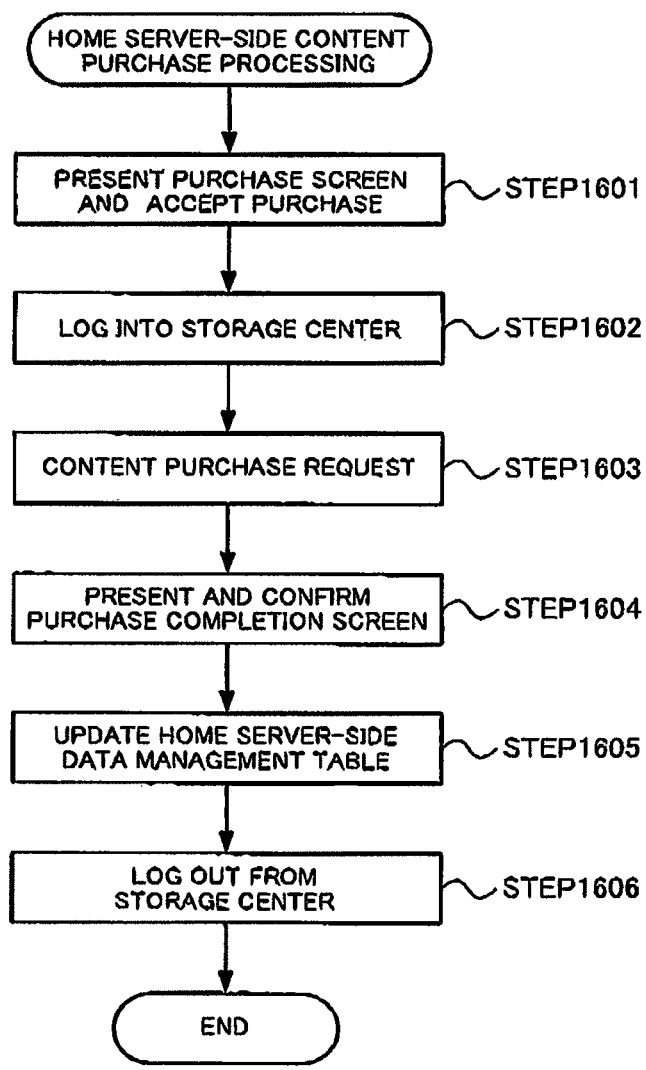
FIG. 16 is a flowchart explaining content purchase processing in the home server according to an embodiment of the present invention.

FIG. 16 is a flowchart explaining the content purchase processing in the home server 32 according to an embodiment of the present invention. The content purchase processing is realized by the processor 321 of the home server 32 executing the processor 321.

Specifically, for example, when the user operates the user interface 323 of the home server 32 and calls up the content purchase function, the home server 32 presents a content purchase screen to the user, and receives a content purchase request from the user (STEP 1601). The expression "content purchase" refers to the user receiving the content from the content server 5 and such content becoming available to the user. Here, there shall be no distinction between a fee-based content purchase and a free content purchase. If a user only receives, for example, encrypted content and thus cannot yet use the content, a phase where the user further receives an encryption key comes into "purchase."

When the home server 32 receives the content purchase request, the home server 32 refers to the home server-side user management table 500, establishes connection to the storage center 4 according to the address of the storage center 4, sends the user ID and the password, and logs into the storage center 4 (STEP 1602). Subsequently, the home server 32 sends the content purchase request received from the user to the storage center 4, and issues a content purchase request to the storage center 4 (STEP 1603). In other words, in this embodiment, the user does not issue a content purchase request directly to the content server 5, but rather issues a content purchase request to the content server 5 via the storage center 4. The content purchase request, for example, includes the content identifying information (e.g., content name and file name). Upon receiving the request, the storage center 4 performs the content purchase of that user to the content server 5. When the storage center 4 obtains the content from the content server 5 on behalf of the user, the storage center 4 stores the obtained content in the storage subsystem 42, and sends a message indicating the completion of purchase to the home server 32.

When the home server 32 receives the message indicating the completion of purchase from the storage center 4, the home server 32 presents a content purchase completion screen to the user, and prompts the user to confirm the purchase (STEP 1604). When the home server 32 receives a confirmation from the user regarding the content purchase completion screen, the home server 32 updates the home server-side data management table 400 according to the received purchase completion message (STEP 1605). The home server 32 thereafter logs out from the storage center 4 (STEP 1606), and then ends the content purchase processing.

By way of this, the content is available to the user. When the user wants to actually use the content, the home server 32 downloads the content from the storage center 4 and provides such content to a prescribed digital device to make it available to the user.

Figure 17:
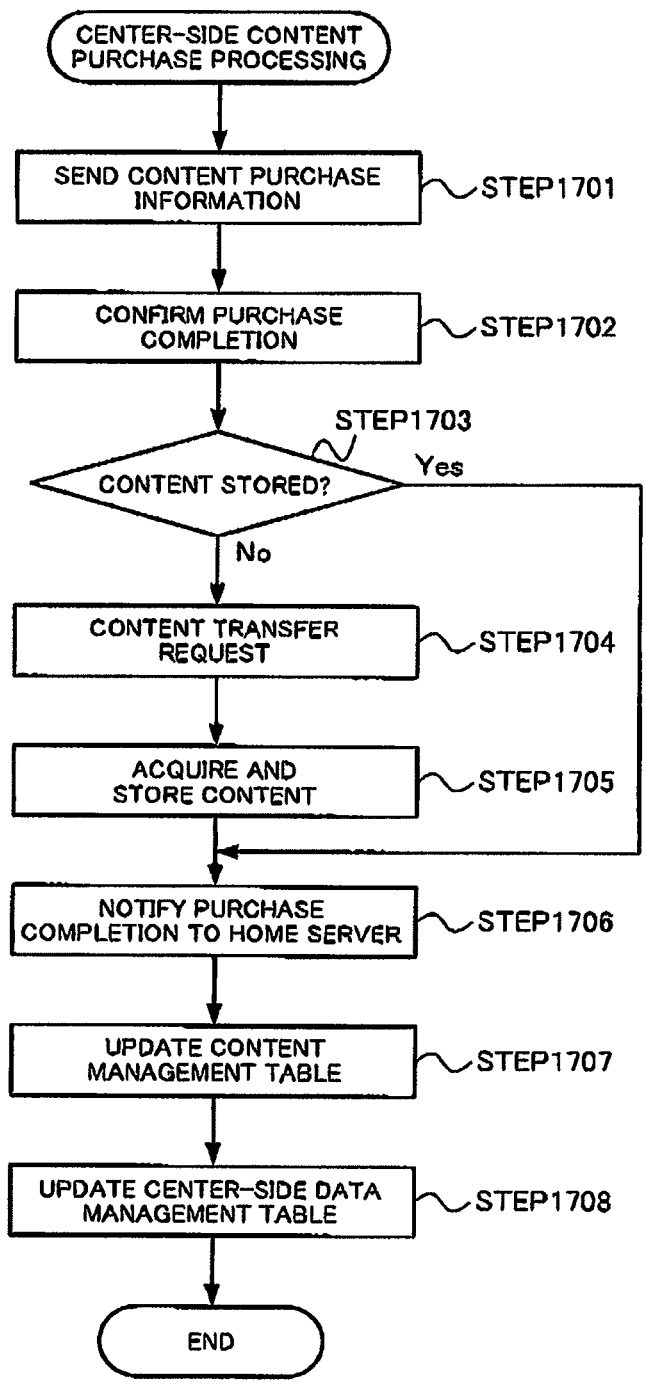
FIG. 17 is a flowchart explaining content purchase processing in the storage center according to an embodiment of the present invention.

FIG. 17 is a flowchart explaining the content purchase processing in the storage center 4 according to an embodiment of the present invention. The content purchase processing is realized by the processor of the center server 41 executing the center server program.

Specifically, the center server 41 monitors whether there is a content purchase request from the home server 32, and, upon receiving a content purchase request, sends the content purchase information based on the content purchase request to the content server 5 (STEP 1701). Content purchase information, for example, includes the user's user ID and settlement information such as the credit card number or the like used in the purchase. The content server 5 makes settlement with the user, and sends a purchase completion message to the center server 41 for notifying that the content is now available to the user.

When the center server 41 receives the purchase completion message from the content server 5 (STEP 1702), the center server 41 refers to the content management table 800, and checks whether the data of that content has already been stored in the storage subsystem 42 (STEP 1703). That is, if the content has already been purchased by another user, this means that the content data is stored in the storage subsystem 42. If the center server 41 determines that the content data is stored (STEP 1703; Yes), the center server 41 sends a purchase completion message to the home server 32 that issued the content purchase request (STEP 1706). The home server 32 that received the purchase completion message updates the home server-side data management table 400 retained in the memory 322.

Meanwhile, if the center server 41 determines that the content data is not stored (STEP 1703; No), the center server 41 sends a transfer request of that content data to the content server 5 (STEP 1704). Upon receiving the transfer request, the content server 5 sends the content data to the center server 41. The center server 41 receives the content data sent from the content server 5, and stores the content data in a prescribed area of the storage subsystem 42 (STEP 1704). Then, the center server 41 sends a purchase completion message to the home server 32 that issued the content purchase request (STEP 1706). The home server 32 that received the purchase completion message updates the home server-side data management table 400.

Subsequently, the center server 41 updates the content management table 800 (STEP 1707). Specifically, the center server 41 registers the name of the provider that sent that content in the provider column 802e of the content management table 800, and registers the storage destination address in the data address column 805. Further, the center server 41 updates the center-side data management table 700 regarding the user who made the content recording reservation (STEP 1708). Specifically, the center server 41 registers the storage destination address in the data address column 705 regarding that content. The home server-side data management table 400 and the center-side data management table 700 are thereby synchronized, and the consistency thereof is maintained.

Figure 18:
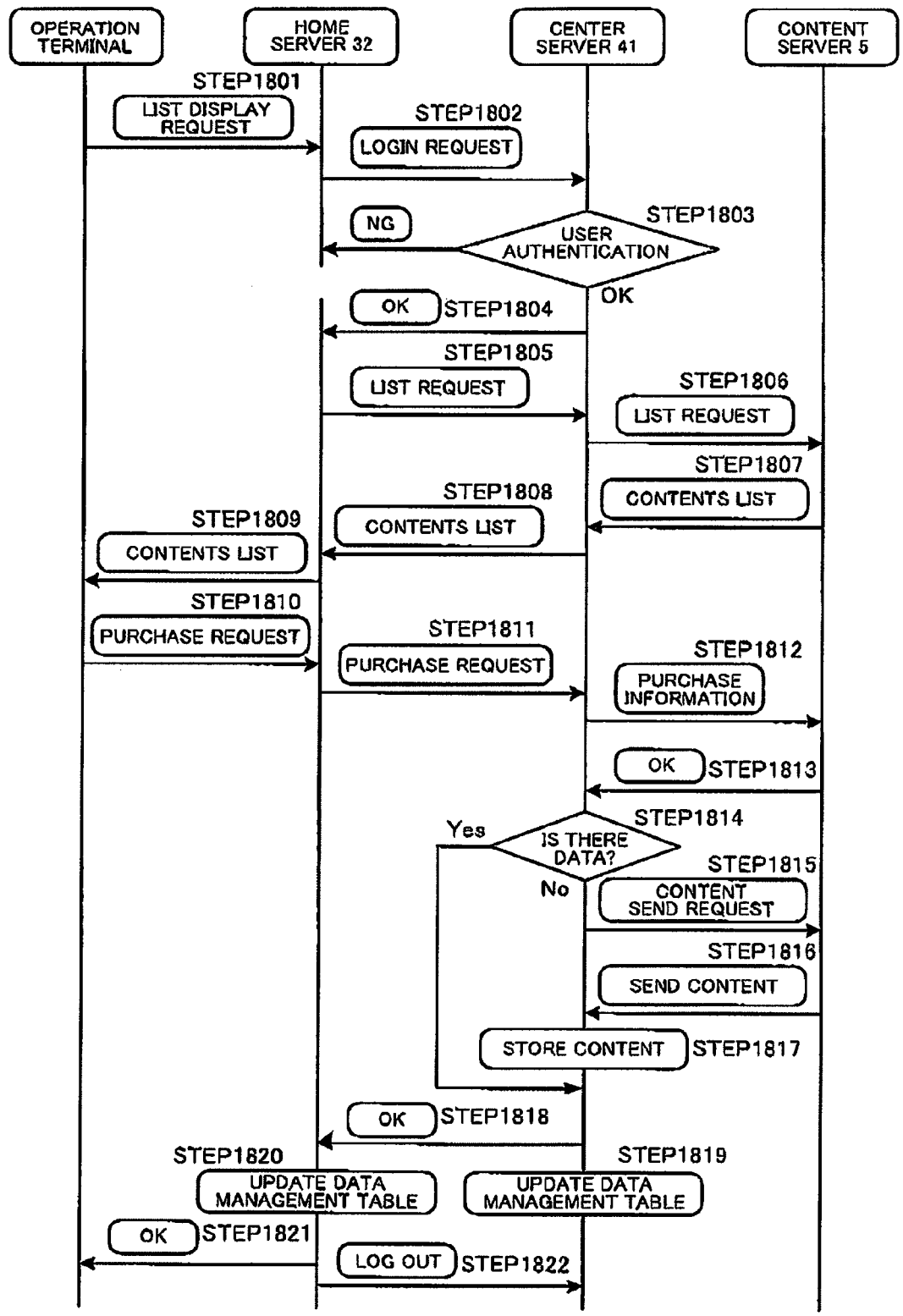
FIG. 18 is a sequence chart explaining an example of content purchase processing in the storage system according to an embodiment of the present invention.

FIG. 18 is a sequence chart explaining an example of the content purchase processing in the storage system 1 according to an embodiment of the present invention. FIG. 18 shows an example where the user makes a content purchase based on the content list.

Specifically, as shown in FIG. 18, the user operates the operation terminal and sends a contents list request to the home server 32 (STEP 1801). A content list is a summary of the contents that are available to the user in the content server 5. The operation terminal may be the user interface of the home server 32, or another digital device 33 such as a PC or a mobile device 35.

The home server 32 that received the content list request sends a login request to the center server 41 (STEP 1802). The center server 41 authenticates the user who sent the login request (STEP 1803), and, if the authentication is successful, sends an authentication success message to the home server 32 (STEP 1804).

Upon receiving the message, the home server 32 sends the content list request to the center server 41 (STEP 1805), and the center server 41 sends the contents list request to the content server 5 (STEP 1806). The content server 5 thereafter sends the contents list to the center server 41 (STEP 1807). In this example, the content list is provided from the content server 5 in accordance with the content list request from the center server 41, but that is not limited thereto. For example, the center server 41 may also receive the distribution of the content list in advance from the content server regularly or irregularly.

The center server 41 stores the received content list in the memory 412, and sends the contents list to the home server 32 (STEP 1808). The home server 32 that received the content list transfers the content list to the operation terminal of the source of request (STEP 1809). The content list is thereby displayed on the user's operation terminal.

The user operates the operation terminal and designates the content to be purchased according to the contents list. The operation terminal sends the content purchase request to the home server 32 according to the user's designation (STEP 1810). Upon receiving the request, the home server 32 sends the content purchase request to the center server 41 (STEP 1811).

When the center server 41 receives the content purchase request, the center server 41 sends purchase information based on the content purchase request to the content server 5 (STEP 1812). The content server 5 makes the content available to the user based on the received content purchase information, and sends a purchase completion message to the center server 41 (STEP 1813).

The center server 41 subsequently checks whether the content data has been previously stored in the storage subsystem 42 (STEP 1814). If the center server 41 determines that the content data is not stored, the center server 41 sends a transfer request of that content data to the content server 5 (STEP 1815). Upon receiving the request, the content server 5 sends the content data to the center server 41 (STEP 1816).

The center server 41 receives the content data sent from the content server 5, and stores the content data in a prescribed area of the storage subsystem 42 (STEP 1817). Subsequently, the center server 41 sends a recording completion message to the home server 32 (STEP 1818), and updates the content management table 800 and the center-side data management table 700 (STEP 1819).

If the center server 41 determines that the content data is stored, the center server 41 immediately sends a purchase completion message to the home server 32 that issued the content purchase request.

Meanwhile, the home server 32 that received the purchase completion message updates the home server-side data management table 400 (STEP 1820). The home server-side data management table 400 and the center-side data management table 700 are thereby synchronized, and the consistency thereof is maintained.

The home server 32 thereafter sends a purchase completion message to the operation terminal (STEP 1821), logs out from the center server 41 (STEP 1822), and then ends the processing.

The processing where the user purchases a content using the mobile device 35 is now explained.

Figure 19:
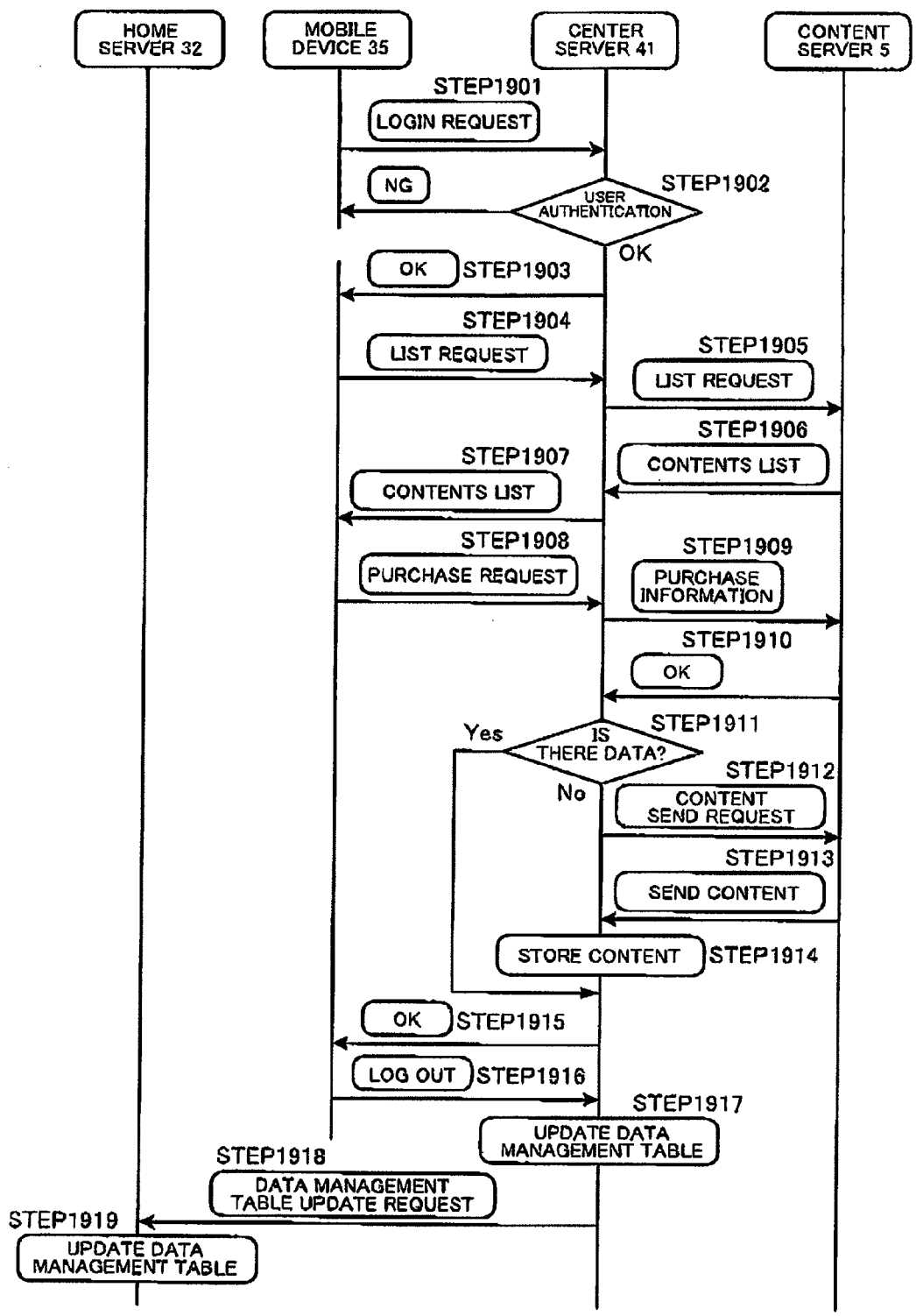
FIG. 19 is a sequence chart explaining an example of content purchase processing in the storage system according to an embodiment of the present invention.

FIG. 19 is a sequence chart explaining an example of the content purchase processing in the storage system 1 according to an embodiment of the present invention.

Specifically, as shown in FIG. 19, the mobile device 35 sends a login request to the center server 41 under the user's operation (STEP 1901). The center server 41 authenticates the user who sent the login request (STEP 1902), and, if the authentication is successful, sends an authentication success message to the mobile device 35 (STEP 1903).

Subsequently, the mobile device 35 sends a content list request to the center server 41 (STEP 1904). The center server 41 sends the content list request to the content server 5 (STEP 1905). Upon receiving the request, the content server 5 sends the content list to the center server 41 (STEP 1906). In this example, the contents list is provided from the content server 5 in accordance with the contents list request from the center server 41, but that is not limited thereto. For example, the center server 41 may also receive the distribution of the content list in advance from the content server regularly or irregularly.

The center server 41 stores the received content list in the memory 412, and sends the content list to the mobile device 35 (STEP 1907). The content list is thereby displayed on the screen of the mobile device 35.

The user operates the mobile device 35 and designates the content item to be purchased according to the contents list. The mobile device sends a content purchase request to the center server 41 according to the user's designation (STEP 1908).

When the center server 41 receives the content purchase request, the center server 41 sends purchase information based on the content purchase request to the content server 5 (STEP 1909). The content server 5 allows the content to be utilized by the user based on the received content purchase information, and sends a purchase completion message to the center server 41 (STEP 1910).

The center server 41 subsequently checks whether the content data has been previously stored in the storage subsystem 42 (STEP 1911). If the center server 41 determines that the content data is not stored, the center server 41 sends a transfer request of that content data to the content server 5 (STEP 1912). Upon receiving the foregoing request, the content server 5 sends the content data to the center server 41 (STEP 1913).

The center server 41 receives the content data sent from the content server 5, and stores the content data in a prescribed area of the storage subsystem 42 (STEP 1914). Subsequently, the center server 41 sends a purchase completion message to the mobile device 35 that issued the content purchase request (STEP 1915). Upon receiving the foregoing message, the mobile device 35 logs out from the center server 41 (STEP 1916).

The center server 41 thereafter updates the content management table 800 and the center-side data management table 700 (STEP 1917). Subsequently, the center server 41 sends an update request of the home server-side user management table 400 to the home server 32 (STEP 1918). Upon receiving the foregoing request, the home server 32 updates the home server-side data management table 400 (STEP 1919). The home server-side data management table 400 and the center-side data management table 700 are thereby synchronized, and the consistency thereof is maintained.

(3-4) Content Playback Processing

Figure 20:
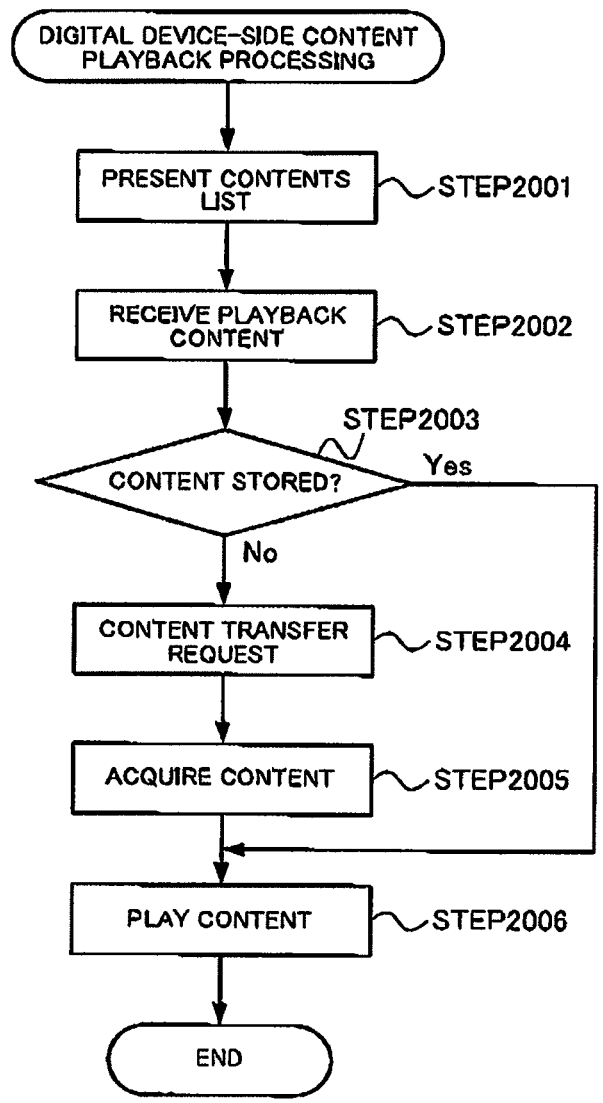
FIG. 20 is a flowchart explaining content reproduction processing performed by a home system 3 in the storage system according to an embodiment of the present invention.

FIG. 20 is a flowchart explaining the content reproduction processing to be performed by the home system 3 in the storage system 1 according to an embodiment of the present invention. Specifically, FIG. 20 explains the content reproduction processing to be performed by a digital device in the home system 3. The content reproduction processing is processing to be performed, for instance, when the user wishes to play the video content on the TV 33*d*.

Foremost, the user operates the operation terminal (e.g., TV remote control) and issues a command for displaying a list of available content items on a screen of the digital device 33 (e.g., the TV 33*d*). Upon receiving the command, the digital device 33 obtains a available content list from the home server 41, and displays the available content list on the screen (STEP 2001).

Subsequently, the user designates a content item to be reproduced according to the available content list, and issues a reproduction command. When the digital device 33 receives the reproduction command (STEP 2002), the digital device 33 determines whether the designated content item is stored in the self-storage apparatus (STEP 2003).

If the digital device 33 determines that the designated content item is stored in the self-storage apparatus (STEP 2003; Yes), the digital device 33 starts to reproduce the content item without requesting the content item to the home server 32 (STEP 2006).

Meanwhile, if the digital device 33 determines that the designated content item is not stored in the self-storage apparatus (STEP 2003; No), the digital device 33 issues a content transfer request to the home server 32 (STEP 2004). If the digital device 33 does not have its own storage apparatus, the digital device 33 directly issues a content transfer request to the home server 32. The digital device 33 thereafter starts to reproduce the content data sent from the home server 32 (STEP 2006).

Figure 21:
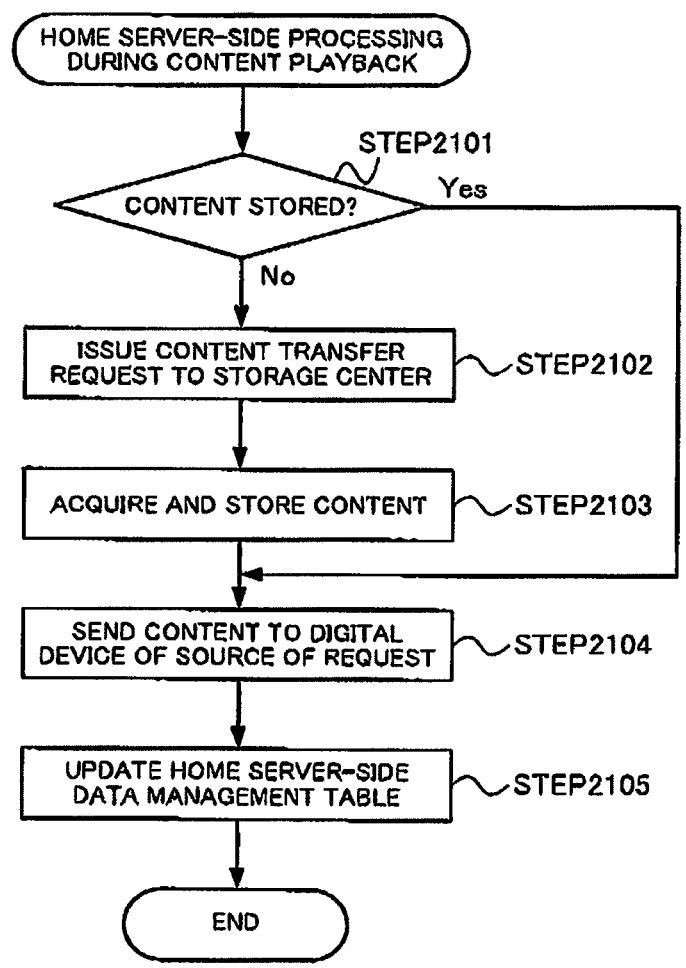
FIG. 21 is a flowchart explaining content reproduction processing performed by a home system 3 in the storage system according to an embodiment of the present invention.

FIG. 21 is a flowchart explaining the content reproduction processing to be performed by the home system 3 in the storage system 1 according to an embodiment of the present invention. Specifically, FIG. 21 explains the processing in the home server 32 when a content transfer request for reproducing the content is issued from the digital device 33.

Specifically, as shown in FIG. 21, when the home server 32 receives a content transfer request from the digital device 33, the home server 32 determines whether the designated content data is stored in its own storage apparatus 324 (STEP 2101).

If the home server 32 determines that the designated content data is stored in its own storage apparatus 324 (STEP 2101; Yes), the home server 32 sends the content data to the digital device 33 of the source of request (STEP 2104).

Meanwhile, if the home server 32 determines that the designated content data is not stored in the self-storage apparatus 324 (STEP 2101; No), the home server 32 logs into the center server 41, and issues a transfer request of that content data (STEP 2102). Upon receiving the request, the center server 41 reads the content data from the storage subsystem 42 and sends the content data to the home server 32.

When the home server 32 receives the content from the center server 41, the home server 32 stores the content in its own storage apparatus 324 (STEP 2103), and sends the content data to the digital device 33 of the source of request (STEP 2104). In this case, the home server 32 may send the content data to the digital device 33 of the source of request at the point in time that the storage of the content data sent from the center server 41 is complete, or in parallel while storing the content data.

The home server 32 thereafter updates the home server-side data management table 400 (STEP 2105). Specifically, the home server 32 registers the storage destination address in the data address column 405a regarding that content in the home server-side data management table 400, and registers the current time in the last access date column 402g.

Figure 22:
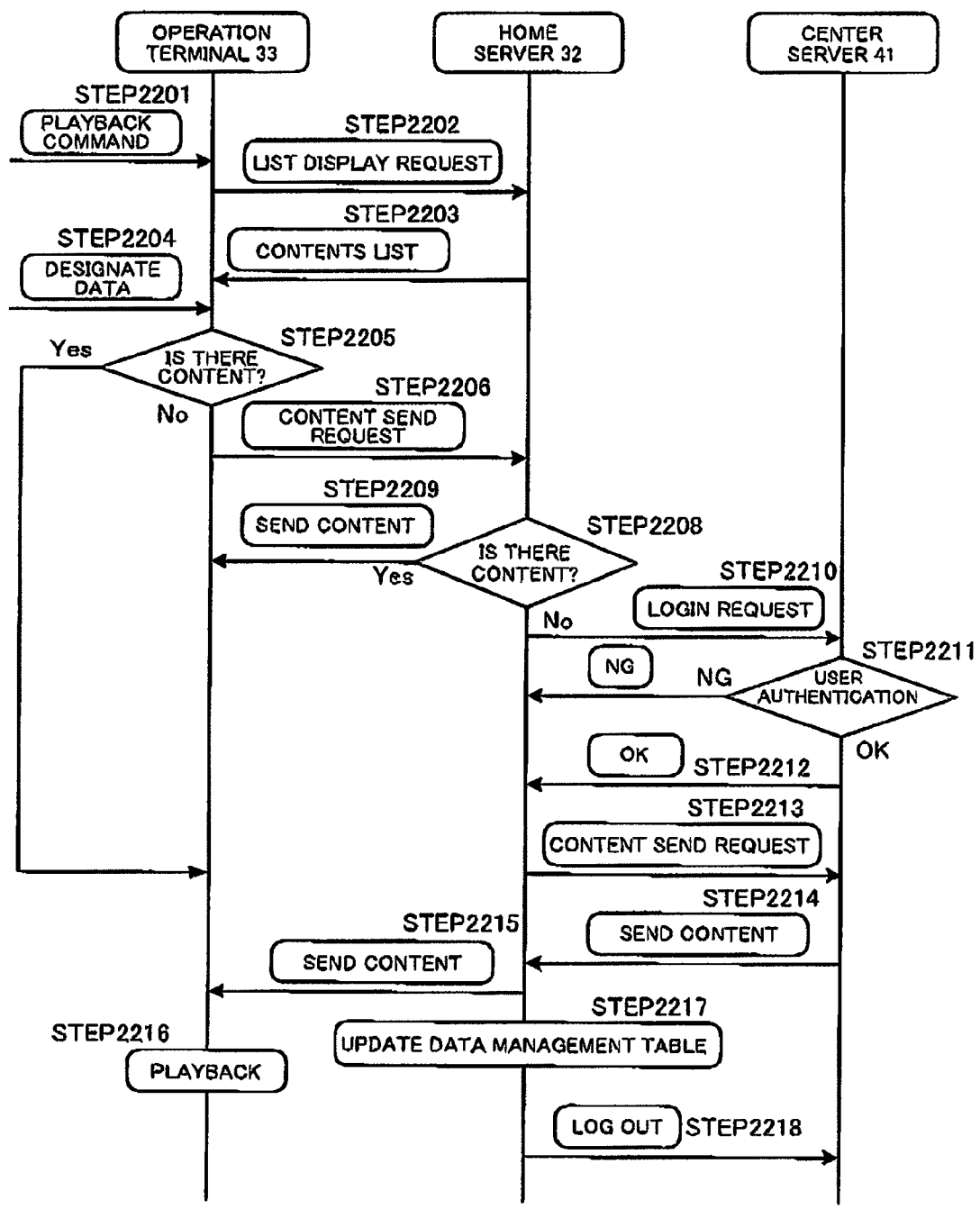
FIG. 22 is a sequence chart explaining an example of content reproduction processing in the storage system according to an embodiment of the present invention.

FIG. 22 is a sequence chart explaining an example of the content reproduction processing in the storage system 1 according to an embodiment of the present invention. FIG. 22 shows an example where the user plays the digital content based on the contents list.

Foremost, the user operates the operation terminal (e.g., TV remote control) and issues a command for displaying a list of available content item on a screen of the digital device 33 (e.g., a TV) (STEP 2201). Upon receiving the command, the digital device 33 sends a content list request to the home server 32 (STEP 2202), and the home server 32 sends the content list to the digital device 33 (STEP 2203). The home server 32 displays the obtained content list on the screen, and receives the content reproduction command from the user (STEP 2204).

The digital device 33 that received the reproduction command determines whether the designated content data is stored in its own storage apparatus (STEP 2205), and, when the digital device 33 is determined that the designated content data is stored in the self-storage apparatus (STEP 2205; Yes), starts to reproduce the content data (STEP 2216).

Meanwhile, if the digital device 33 determines that the designated content data is not stored in its own storage apparatus (STEP 2205; No), the digital device 33 issues a transfer request of that content data to the home server 32 (STEP 2206).

The home server 32 that received the content transfer request determines whether the designated content data is stored in its own storage apparatus 324 (STEP 2208). If the home server 32 determines that the designated content data is stored in its own storage apparatus (STEP 2208; Yes), the home server 32 sends that content data to the digital device 33 of the source of request (STEP 2209). The digital device 33 thereafter starts to reproduce the content data sent from the home server 32 (STEP 2216).

Meanwhile, if the home server 32 determines that the designated content data is not stored in its own storage apparatus 324 (STEP 2208; No), it sends a login request to the center server 41 for downloading the content data from the storage center 4 (STEP 2210).

The center server 41 authenticates the user who sent the login request (STEP 2211), and, if the authentication is successful, sends an authentication success message to the home server 32 (STEP 2212).

Subsequently, the home server 32 sends the content transfer request to the center server 41 (STEP 2213), and, in response to this request, the center server 41 reads the content data from the storage subsystem 42, and sends the designated content data to the home server 32 (STEP 2214). When the home server 32 receives the content data from the center server 41, the home server 32 stores the content data in the storage apparatus 324, and further sends the content data to the digital device 33 of the source of request (STEP 2215). In doing so, the digital device 33 starts to reproduce the content sent from the home server 32 (STEP 2216).

Meanwhile, when the home server 32 completes the storage of the content data, it updates the home server-side data management table 400 (STEP 2217), and thereafter logs off from the center server 41 (STEP 2218).

Each of the foregoing embodiments is an exemplification for explaining the present invention, and is not intended to limit this invention to the foregoing embodiments. The present invention may be worked in various modes as long as such working does not deviate from the gist of this invention. For example, although the processing of the various programs was explained sequentially, the present invention is not limited thereto. Thus, a configuration may also be adopted where the processing order is changed or the processing is performed in parallel as long as there is no contradiction in the processing result.

The present invention can be broadly applied to storage systems that are used as an external storage center by the home system.

What is claimed is:

1. A computer system comprising:
a server having a first storage area; and
a storage center coupled to the server, and having a second storage area,
wherein when the server stores first data in the first storage area, the first storage area having a remaining capacity that is not sufficient to store the first data, the server determines whether there is any data stored in both the first storage area in the server and the second storage area in the storage center,
wherein if there is any data stored in both the first storage area in the server and the second storage area in the storage center, the server deletes second data stored in the first storage area to secure a storage area for storing the first data in the first storage area, the deleted second data being included in the data stored in both the first storage area in the server and the second storage area before deleting the second data stored in the first storage area,
wherein if data is not stored in both the first storage area in the server and the second storage area in the storage center, but is stored in the first storage area and is not stored in the second storage area, the server transfers third data, which is the data stored in the first storage area, to the storage center and deletes the third data stored in the first storage area to secure the storage area for storing the first data in the first storage area,
wherein the server manages management information for the second data and the third data, and the storage center manages management information for the second data,
wherein when the server deletes the second data stored in the first storage area, the server deletes the address of the first storage area for the second data in the management information and updates the management information,
wherein after the server transfers the third data to the storage center, the storage center creates the management information for the third data, and
wherein when the server deletes the third data, the server deletes the address of the third storage area for the third data in the management information and updates the management information to indicate that the third data is stored in the storage center.

2. A computer system according to claim 1, wherein the first data, the second data, and the third data are content data.

3. A computer system according to claim 1, wherein the server extracts data having the oldest last access data of the data as the second data.

4. A computer system according to claim 1, wherein the server extracts data having the oldest data of the data stored in the first storage area as the third data.

5. A computer system according to claim 1,
wherein the server has a data management table indicating whether the data is stored in the first storage area and whether the data is stored in the second storage area, and
wherein the server determines whether the data is stored in both the first storage area in the server and the second storage area in the storage center by referring the data management table.

6. A data management method in a computer system, the computer system comprising a server having a first storage area, and a storage center coupled to the server, and having a second storage area, the data management method comprising:
when the server stores first data in the first storage area, the first storage area having a remaining capacity that is not sufficient to store the first data, determining, by the server, whether there is any data stored in both the first storage area in the server and the second storage area in the storage center;
if there is any data stored in both the first storage area in the server and the second storage area in the storage center, deleting, by the server, second data stored in the first storage area to secure a storage area for storing the first data in the first storage area, the deleted second data being included in the data stored in both the first storage area in the server and the second storage area before deleting the second data stored in the first storage area;
if data is not stored in both the first storage area in the server and the second storage area in the storage center, but is stored in the first storage area and is not stored in the second storage area, transferring, by the server, third data, which is the data stored in the first storage area, to the storage center and deletes the third data stored in the first storage area to secure the storage area for storing the first data in the first storage area;
managing, by the server, management information for the second data and the third data, and managing, by the storage center, management information for the second data;
when the server deletes the second data stored in the first storage area, deleting, by the server, the address of the first storage area for the second data in the management information, and updating, by the server, the management information;
after the server transfers the third data to the storage center, creating, by the storage center, the management information for the third data; and
when the server deletes the third data, deleting, by the server, the address of the third storage area for the third data in the management information, and updating, by the server, the management information to indicate that the third data is stored in the storage center.

7. A data management method according to claim 6, wherein the first data, the second data, and the third data are content data.

8. A data management method according to claim 6, further comprising:
extracting, by the server, data having the oldest last access data of the data as the second data.

9. A data management method according to claim 6, further comprising:
extracting, by the server, data having the oldest data of the data stored in the first storage area as the third data.

10. A data management method according to claim 6,
wherein the server has a data management table indicating whether the data is stored in the first storage area and whether the data is stored in the second storage area, and
wherein the server determines whether the data is stored in both the first storage area in the server and the second storage area in the storage center by referring the data management table.

11. A computer system according to claim 1,
wherein after receiving a request to read fourth data, the server refers to the management information, and
wherein if the fourth data is not stored in the first storage area, the server acquires the fourth data from the storage center.

12. A data management method according to claim 6, further comprising:
after receiving a request to read fourth data, referring, by the server, to the management information; and if the fourth data is not stored in the first storage area, acquiring, by the server, the fourth data from the storage center.

* * * * *